US006795707B2

(12) United States Patent
Martin et al.

(10) Patent No.: US 6,795,707 B2
(45) Date of Patent: Sep. 21, 2004

(54) METHODS AND SYSTEMS FOR CORRELATING TELECOMMUNICATION ANTENNA INFRASTRUCTURE PLACEMENT INFORMATION TO PROVIDE TELECOMMUNICATION QUALITY OF SERVICE INFORMATION

(76) Inventors: Jeffrey W. Martin, 40 E. Verdugo Ave., Burbank, CA (US) 91502; Campbell Hawkins, 40 E. Verdugo Ave., Burbank, CA (US) 91502; Paul Derby, 40 E. Verdugo Ave., Burbank, CA (US) 91502

(*) Notice: Subject to any disclaimer, the term of this patent is extended or adjusted under 35 U.S.C. 154(b) by 485 days.

(21) Appl. No.: 09/863,871

(22) Filed: May 23, 2001

(65) Prior Publication Data

US 2002/0115447 A1 Aug. 22, 2002

Related U.S. Application Data

(60) Provisional application No. 60/206,609, filed on May 23, 2000, and provisional application No. 60/254,075, filed on Dec. 7, 2000.

(51) Int. Cl.$^7$ ................................................ H04Q 7/20
(52) U.S. Cl. .................... 455/446; 455/456.1; 455/423; 455/67.11; 455/457; 455/445
(58) Field of Search ................................ 455/446, 445, 455/456.1, 423, 67.11, 406, 566, 414.1, 556.1, 457; 705/1

(56) References Cited

U.S. PATENT DOCUMENTS

| 5,046,082 | A | | 9/1991 | Zicker et al. | |
|---|---|---|---|---|---|
| 5,159,625 | A | | 10/1992 | Zicker | |
| 5,394,324 | A | | 2/1995 | Clearwater | |
| 5,561,841 | A | * | 10/1996 | Markus | 455/446 |
| 5,727,165 | A | | 3/1998 | Ordish et al. | |
| 5,794,207 | A | | 8/1998 | Walker et al. | |
| 5,799,249 | A | * | 8/1998 | Kennedy et al. | 455/411 |
| 5,826,244 | A | | 10/1998 | Huberman | |
| 5,835,896 | A | | 11/1998 | Fisher et al. | |
| 5,845,211 | A | * | 12/1998 | Roach, Jr. | 455/436 |
| 5,862,475 | A | | 1/1999 | Zicker et al. | |
| 5,890,137 | A | | 3/1999 | Koreeda | |
| 6,009,330 | A | * | 12/1999 | Kennedy et al. | 455/445 |
| 6,047,274 | A | | 4/2000 | Johnson et al. | |
| 6,058,312 | A | * | 5/2000 | Kimura | 455/445 |
| 6,094,580 | A | * | 7/2000 | Yu et al. | 455/446 |
| 6,324,404 | B1 | * | 11/2001 | Dennison et al. | 455/456.1 |
| 6,456,854 | B1 | * | 9/2002 | Chern et al. | 455/457 |
| 6,650,896 | B1 | * | 11/2003 | Haymes et al. | 455/423 |
| 2003/0069029 | A1 | * | 4/2003 | Dowling et al. | 455/456 |

OTHER PUBLICATIONS

PCT International Search Report, mailed Dec. 31, 2001.
ARTS (Activation Reconciliation & Tracking System), Point.com, Inc., 1998–2000 (www.point.com).
The eStats Report, eCommerce.B2B, Jan. 1999 Part II of II.
Williams, C., "Meet Jorgen Jetson—Swedes Take Lead in 'Smart' Living," Los Angeles Times 2001 (www.latimes.com/cgi–bin/print.cgi).
"Virtual Utilities Peddle Power Over the Web," Eastern Ed., Jan. 6, 2000, vol. CCXXXV, No. 4, Sec. B, p. B1.

* cited by examiner

Primary Examiner—William Trost
Assistant Examiner—Sharad Rampuria
(74) Attorney, Agent, or Firm—Knobbe, Martens, Olson & Bear LLP

(57) ABSTRACT

The present invention is related to methods and systems for correlating telecommunication antenna infrastructure placement information to provide telecommunication quality of service information. In one embodiment, a system includes a database configured to store cellular antenna location information for a plurality of cellular antennas associated with a first service provider, and to store cellular antenna placement information for a plurality of antennas associated with a second service provider. The system further includes a first instruction configured to transmit a request over a network to a first terminal for a user to identify a first location in which the user intends to utilize cellular service, a second instruction configured to request the user to identify a travel route connecting to the first location on which the user uses cellular service, a third instruction configured to determine the cellular coverage provided by the first service provider for areas along the travel route.

23 Claims, 38 Drawing Sheets

For Energy Savings Register Now!

Choose a User ID (5 to 15 characters)

Choose a Password                    Re-enter Password for Confirmation (5 to 15 characters)

○ Residential Account
○ Commercial Account

Enter your e-mail address

Credit Card Information
Select Credit Card [VISA ▼]
Experation Date:   Month [  ]   Day [  ]   Year [2000 ▼]

Account Number: [          ]

FIG. 3

Residential Account Information

How many people live at account address? [    ]

How many people are typically at home between
8:00 AM TO 5:00 PM, Monday through Friday? [    ]

How many people are typically at home between
5:01 PM TO 7:59 AM, Monday through Friday? [    ]

How many people are typically at home
Sunday & Saturday? [    ]

Do you have Central Airconditioning?   ○ Yes
                                        ○ No How many window mounted Airconditioning Units do you have? [    ]

Do you have Central Heating?   ○ Yes
                                ○ No

How many spare Heaters do you use? [    ]

Residential Account Information

Do you have a Dishwasher?   ○ Yes
○ No

Do you have a Washing Machine?   ○ Yes
○ No

Do you have a Clothes Dryer?   ○ Yes
○ No

My Clothes Dryer is   ○ Gas
○ Electric

How many Refrigerators do you have? [    ]

Do you have a Pool?   ○ Yes
○ No

Do you have a Hot Tub?   ○ Yes
○ No

○ Do you prefer that your energy is provided via alternative energy sources (solar, geothermal, etc.)

○ Do you want the lowest cost energy provider?

FIG. 5B

Commercial Account Information

What type of Commercial activity is being
conducted at account address? [Light Manufacturing ▼]

How many people are employed [ ]

How many employees work between 8:00 AM — 5:00 PM? [ ]

How many employees work between 5:01 PM — 7:59 AM? [ ]

What is the Make and Model of your HVAC system

Make: [ ]

Model: [ ]

Do you have planned periodical factory shutdowns?  ○ Yes  ○ No

From: [ ]  To: [ ]

FIG. 6A

Commercial Account Information

Please provide the address, location, read date, meter type, rate class of each meter:

Meter 1:

[                    ]
Location:

[                    ]
Street Address:

[          ]   [CA ▼]   [          ]
City:          State:   Zip Code:

Month[  ]  Day[  ▼]  Year[  ▼]  Rate Class[  ]

[Interval ▼]
Meter Type:

( More meters? )        ( No more meters? )

FIG. 6B

Commercial Account Information

How many bills do you want?

○ All meters billed together twice a month
  (interest charges may be incured for meters billed after their individual bill date)

○ Site billing

What type of billing do you want?

○ Consolidated billing
  (commodity and non-commodity charges on a single bill)

○ Dual billing
  (commodity and non-commodity charges on seperate bills)

Are you part of the following chains:
[ ACME Super Markets ▼ ]

Are you a member of the following professional associations:
[ Energy Consumers Association ▼ ]

Does your company:
○ Own the facility
○ Lease the facility

What is square footage of facility: [       ]

*FIG. 6C*

CUSTOMER PROFILE INPUT
SCREEN #2

CUSTOMER INFORMATION

Tax Identification Number:

Customer Name:

Primary Contact Name:

Primary Contact Address 1:
Primary Contact Address 2:
Primary Contact Address 3:

Primary Contact City:     State:     Zip:

Commodity to be Priced:
- ○ Telecom
- ○ Gas
- ○ Water
- ○ Electricity
- ○ Bandwidth

*FIG. 9B*

CUSTOMER PROFILE INPUT
SCREEN #3

CUSTOMER UTILITY AND USAGE INFORMATION

Service Account Number: [ ]

Service Account Address 1: [ ]
Service Account Address 2: [ ]
Service Account Address 3: [ ]

What State Is The Service Address Located: [ ]   ZIP: [ ]

Current Provider: [ ]

How Many Meters Are Associated With This Service Account Number: [ ]

Meter Number: [ ]

Meter Billing Address 1: [ ]
Meter Billing Address 2: [ ]
Meter Billing Address State: [ ]

Rate Class: [ ]

From: [ ]       To: [ ]   Days: [ ]

| | | | |
|---|---|---|---|
| Facilities Rel Demand: [ ] | Rate: [ ] | Quantity: [ ] | Units: [ ] |
| Summer On Peak: [ ] | Rate: [ ] | Quantity: [ ] | Units: [ ] |
| Summer Mid Peak: [ ] | Rate: [ ] | Quantity: [ ] | Units: [ ] |
| Summer Off Peak: [ ] | Rate: [ ] | Quantity: [ ] | Units: [ ] |
| Winter Mid Peak: [ ] | Rate: [ ] | Quantity: [ ] | Units: [ ] |
| Customer Charge: [ ] | | Quantity: [ ] | Units: [ ] |
| PX Energy Credit: [ ] | | Quantity: [ ] | Units: [ ] |
| Revenue Cylce Services Credit: [ ] | | | Units: [ ] |

○ Would you like to aggregate your load with other customers to drive a lower cost?

*FIG. 9C*

Supplier Contract Input Screen

Product Name:

Product Abbreviation:

Product Active:

State:

| Use Element | Contract Element | Element Type | Element Value | Account Value |
|---|---|---|---|---|
| ☐ | Auto Renewal | Alpha | Yes/No | Y/N |
| ☐ | CA PX Index Price | Matarix | .023457 | Y/N |
| ☐ | ComEd RCDS Customer Class/Demand | Alpha | 6L | Y/N |
| ☐ | Contract End Date | Numeric | 12/31/00 | Y/N |
| ☐ | Contract Start Date | Numeric | 1/1/00 | Y/N |
| ☐ | Contract Term | Alpha | 8 months | Y/N |
| ☐ | Fixed Discount Amount | Numeric | .002 | Y/N |
| ☐ | Fixed Discount Base | Numeric | 2% | Y/N |
| ☐ | Fixed Discount Percent | Numeric | 2% | Y/N |
| ☐ | Fixed Energy Price (Contract Term) | Numeric | .031235 | Y/N |
| ☐ | Fixed Price 5/2000-10/2000 (cents/kwh) | Numeric | .031235 | Y/N |
| ☐ | Fixed Price 11/2000-4/2001 (cents/kwh) | Numeric | .053479 | Y/N |
| ☐ | Late Payment Charge | Numeric | 1.5% | Y/N |
| ☐ | Net Terms (Payment Terms) | Numeric | 30 days | Y/N |
| ☐ | Retailer Savings Price | Numeric | .034567 | Y/N |
| ☐ | Renewal Term | Alpha | 8 months | Y/N |

Edit Users

Add New User

Add New Product

Add Product Element

Add UDC

FIG. 10

Contract Element Name:

☐ Numeric
☐ Alpha
☐ Percent
☐ Matrix

| Value | Default |
|---|---|
| Enter New Value Here | ☐ |

Edit Users

Add New User

Add New Product

Add Product Element

Add UDC

*FIG. 11*

Edit Users

Add New Uers

| Product Abbreviation | Product Name |
|---|---|
| AZFDT | Arizona Fixed Discount |
| NJFDA6 | Fixed Discount-Actual Credit Service |
| NJFDAC | Fixed Discount of Actual Shopping Credit |
| NJFP | New Jersey Fixed Price |
| MAFPBE | Fixed Price Boston Edison |
| ILFDT | Guaranteed Energy Savings |
| ILPPOS | IL PPO Savings |
| ILRS | IL Retailer Savings |

Edit Product

Add New Product

Add Product Element

*FIG. 12*

| Offer ID | Customer Name | Open Date | Close Date |
|---|---|---|---|
| 2755 | Acme Manufacturing | 3/31/090 | 4/7/00 |
| 2756 | ABC Company | 3/31/00 | 4/7/00 |
| 2757 | XYZ, Inc. | 4/6/00 | 5/6/00 |

Edit Users

Add New Uers

Edit Product

Add New Product

Add Product Element

Add UDC

*FIG. 13*

Customer Name: Acme Manufacturing

Contract Type: AZFDT

Status of Offer: Proposed

Edit Users

Add New User

| Service Accounts and Elements | |
|---|---|
| 1227602901 Historical Usage | Contract End Date: May 2001<br>Contract Start Date: September 2000<br>Contract Term: 9 months<br>Fixed Discount Percent: 11.3% |
| 1227603307 Historical Usage | Contract End Date: May 2001<br>Contract Start Date: September 2000<br>Contract Term: 9 months<br>Fixed Discount Percent: .023457 |
| 1227604136 Historical Usage | Contract End Date: May 2001<br>Contract Start Date: September 2000<br>Contract Term: 9 months<br>Fixed Discount Percent: 10.3% |

Edit Product

Add New Product

Add Product Element

Add UDC

*FIG. 14*

| Service Accounts and Elements | |
|---|---|
| Supplier #1<br><br>Supplier Profile<br><br>Supplier's Financials<br><br>Supplier's Customer Service Ranking: 1<br><br>Supplier's offer represents a 10% savings over current pricing | Contract End Date: May 2001<br><br>Contract Start Date: September 2000<br><br>Contract Term: 9 Months<br><br>Fixed Discount Percent: 11.3% |
| Supplier #2<br><br>Supplier Profile<br><br>Supplier's Financials<br><br>Supplier's Customer Service Ranking: 2<br><br>Supplier's offer represents a 8% savings over current pricing | Contract End Date: May 2001<br><br>Contract Start Date: September 2000<br><br>Contract Term: 9 Months<br><br>Fixed Price: .034572% |
| Supplier #3<br><br>Supplier Profile<br><br>Supplier's Financials<br><br>Supplier's Customer Service Ranking: 1<br><br>Supplier's offer represents a 9% savings over current pricing | Contract End Date: May 2001<br><br>Contract Start Date: September 2000<br><br>Contract Term: 9 Months<br><br>Fixed Discount Percenter: 10.3% |

*FIG. 15*

CUSTOMER INTERFACE-SERVICE PLAN DRIVE INPUTS

| 1. | PLEASE ENTER YOUR ZIP CODE | |
|---|---|---|
| 2. | TYPE OF SERVICE DIRED(BASIC NO FRILL, FAMILY, BIZ...)? | ▼BASIC |
| 3. | COVERAGE AREA(LOCAL,REG.,NAT'L,GLOB.)? | ▼LOCAL |
| 4. | EXISTING PROVIDER? | ▼COMPANY A |
| 5. | AMOUNT OF CURRENT BILL PER MONTH? | ▼0-$35.00 |
| 6. | DO YOU HAVE A PROVIDER OF CHOICE? | ▼COMPANY B |
| 7. | DO YOU HAVE A TECHNOLOGY OF CHOICE? | ▼CDMA |
| 8. | DO YOU HAVE A HANDSET OF CHOICE? | ▼COMPANY E |
| 9. | HOW MANY CALLS DO YOU EXPECT TO MAKE A WEEK? | ▼1-25 |
| 10. | HOW MANY MINUTES PER CALL? | ▼1-5 |
| 11. | WHAT ARE YOUR PEAK CALLING HOURS? | ▼9-5 |
| 12. | HOW MUCH DO YOU PLAN TO SPEND A MONTH? | ▼$25-$35 |
| 13. | PERCENTAGE OF CALLS THAT ARE LONG DISTANCE? | ▼0-10% |
| 14. | PLAN FEATURES DESIRED: | |
| | • PREPAID | ✓ |
| | • 1st INCOMING CALL FREE | ✓ |
| | • NO ACTIVATION FEE | ✓ |
| | • NO CANCELLATION FEE | ✓ |
| 15. | PHONE FEATURES DESIRED: | |
| | • CALLER ID | ✓ |
| | • WEB-ENABLED | ✓ |
| | • VOICE MAIL | ✓ |
| | • ROAD SIDE ASSISTANCE | ✓ |
| 16. | ARE YOU A MEMBER OF ANY OF THE FOLLOWING GROUPS? (AAA, AARP, SAG, ETC.) | ▼AAA |
| 17. | CONTACT DURATION DESIRED? | ▼1 YEAR |
| 18. | WOULD YOU CONSIDER BUYING FROM A RESELLER? | ▼1 YEAR |
| 19. | WOULD YOU CONSIDER PAYING YOUR BILL ONLINE? | ▼1 YEAR |
| 20. | IMPORTANCE OF PRICE vs. QUALITY | ▼1 YEAR |
| | WOULD LIKE TO KNOW THE BEST ISP RATE IN YOUR AREA? | [Y/N] |
| | WOULD LIKE INFO ON COOL ACCESSORIES FOR YOUR HANDSET? | [Y/N] |
| | WOULD LIKE INFO ON COOL ACCESSORIES FOR YOUR HANDSET? | [Y/N] |
| | PLEASE PRESS THE SUBMIT BUTTON TO LEARN ABOUT THE BEST PRODUCTS AND SERVICES THAT MATCH YOUR SPECIFIC NEEDS | [SUBMIT] |

*FIG. 19*

FIPS [06019] County [Fresno] State [CA]

FCC License Areas

| | | |
|---|---|---|
| CMA (Cellular Market Area) | 074 | Fresno |
| BTA (Basic Trading Area) | 157 | Fresno, CA |
| MTA (Major Trading Area) | 4 | San Francisco-Oakland-San Jose |
| RPC (Regional PCS Area) | 5 | West |
| BEA (Economic Area) | 162 | Fresno, CA |
| MEA (Major Economic Area) | 43 | San Francisco-Oakland-San Jose |
| REA (Regional Economic Area) | 6 | West |
| EAG (Economic Area Grouping) | 6 | Pacific |
| VPC (VHF Public Coast Station Area) | 6 | Southern Pacific |
| PSR (Public Safety Planning Region) | 6 | California - North |

| Cities | ZIP |
|---|---|
| Auberry | 93602 |
| Big Creek | 93605 |
| Biola | 93606 |
| Burrel | 93607 |
| Cantua Creek | 93608 |
| Caruthers | 93609 |
| Clovis | 9361X |
| Coalinga | 93210 |
| Del Rey | 93616 |
| Dunlap | 93621 |
| Firebaugh | 93622 |
| Five Points | 93624 |
| Fowler | 93625 |
| Fresno | 93XXX |

| Cities | Latitude | Longitude |
|---|---|---|
| Caruthers-Ra | 36572150 | -11992497 |
| Coalinga | 36199250 | -12040151 |
| Firebaugh | 36861883 | -12061063 |
| Fowler | 36629433 | -11969269 |
| Fresno | 36780250 | -11976144 |
| Huron | 36254625 | -12008665 |
| Kerman | 36723892 | -12009080 |
| Kingsburg | 36543150 | -11954239 |
| Laton division | 36452667 | -11970067 |
| Mendota | 36634200 | -12056597 |
| Orange | 36616917 | -11934049 |
| Parlier-Del | 36621550 | -11953468 |
| Reedley | 36658267 | -11943266 |
| Riverdale | 36450155 | -11990408 |
| Sanger | 36763628 | -11954999 |

CMA Licensees

| | Call Sign |
|---|---|
| AT&T WIRELESS SERVICES OF CALIFORNIA, | KNKA366 |
| FRESNO MSA LIMITED PARTNERSHIP | KNKA301 |
| GULF COAST BROADCASTING | KNKR215 |

FCC Data Number of Locations [67]

| Call Sign | Location | | | |
|---|---|---|---|---|
| KNKR215 | BIG CREEK | | | |
| KNKR215 | BIG CREEK | | | |
| KNKA366 | BIG CREEK | FRESNO | | |
| KNKA301 | Biola | FRESNO | | |
| KNKA301 | CANTUA CREEK | FRESNO | | |
| KNKA366 | Caruthers | FRESNO | | |
| KNKA366 | Clovis | FRESNO | | |

CTIA Data Number of Locations [116]

| Call Sign | Location | | | Latitude | Longitude |
|---|---|---|---|---|---|
| KNKR215 | BIG CREEK | | CA | 37.22 | -119.24 |
| KNKR215 | BIG CREEK | | CA | 37.22 | -119.24 |
| KNKR215 | BIG CREEK | | CA | 37.22 | -119.24 |
| KNKA366 | BIG CREEK | FRESNO | CA | 37.22 | -119.24 |
| KNKA301 | Biola | FRESNO | CA | 36.75 | -119.97 |
| KNKA301 | Biola | FRESNO | CA | 36.75 | -119.97 |

FIG. 33

METHODS AND SYSTEMS FOR CORRELATING TELECOMMUNICATION ANTENNA INFRASTRUCTURE PLACEMENT INFORMATION TO PROVIDE TELECOMMUNICATION QUALITY OF SERVICE INFORMATION

PRIORITY CLAIM

This application claims the benefit of U.S. Provisional Application No. 60/206,609, filed May 23, 2000 and U.S. Provisional Application No. 60/254,075, filed Dec. 7, 2000, which are incorporated herein in their entirety.

BACKGROUND OF THE INVENTION

1. Field of the Invention

The present invention is related to telecommunications, and in particular to correlating telecommunications infrastructures with infrastructure usage.

2. Description of the Related Art

Service providers, such as cellular phone service providers, may be licensed to provide service within specific areas. The service providers install or lease telecommunications infrastructure, such as cellular antennas, within the licensed service areas. The location and density of the infrastructure can be critical in determining the quality of service that the provider has in a given area. Disadvantageously, service users do not have adequate access to or an understanding of such infrastructure information and so cannot adequately evaluate the telecommunications service provider's quality of service. Thus, users contract for telecommunications services before knowing the level of service that they will be receiving. Only after contracting for and utilizing the telecommunication service, can the user determine whether the service provider's telecommunication infrastructure, and hence service, meets the user's needs.

Other problems exist in providing appropriate services. Many industries, such as the telecommunications industry and the energy industry, have undergone extensive deregulation. While deregulation should theoretically lower costs to consumers, for many services, such as electricity, retail customers lack the information and tools needed to make informed pricing and service decisions. Thus, many customers have not taken advantage of deregulation, depriving them of cost savings and/or improved service.

Similarly, providers, such as electricity or telecommunications providers, have not had a cost effective method of identifying and targeting desirable customers. Thus, service providers have not been able to effectively compete with a customer's existing or incumbent provider, and so have been deprived of meaningful opportunities to enter new markets and acquire new customers.

SUMMARY OF THE INVENTION

The present invention is related to methods and systems for correlating user needs with providers' goods and services, such as offered by utility and telecommunications providers. In accordance with one embodiment of the present invention, a distributed information system provides users, service providers, and distributors with sufficient information to enable them to make informed decisions before entering into contractual relationships.

Advantageously, the distributed information system provides consumers with substantially real-time information at the point of sale, ensuring that a consumer's requirements or preferences are correlated with the services and/or products being acquired.

One embodiment of the present invention provides utility suppliers with information related to consumers of utility services or products, such as electricity, gas, water, telecommunication services (including, but not limited to wireless services, cellular services, paging services, and wired phone services), cable, broadband services (including, but not limited to ADSL, DSL, T1, satellite, and cable services), heating oil, and other related products and services. Based on the consumer information, one or more suppliers may generate offers to provide the products and services to consumers, which are then provided to the consumers. More generally, one embodiment of the present invention may be used to facilitate deals between suppliers and purchasers of products and services, where the price of the products or services are based at least in part on a given customer's characteristics or preferences. These customer characteristics may relate to, by way of example, the customer usage of a product or service, such as customer's usage amount, usage location, and time of usage, and/or to financial characteristics, including credit worthiness, payment history, assets, debt, and related characteristics. Such products and services may include leases, mortgages, insurance, investment instruments, and the like.

Advantageously, one embodiment of the present invention acts as a neutral market maker for services, such as utility services, allowing consumers and utility providers to be better and more efficiently matched. A plurality of consumer profiles are generated, and based on these profiles a supplier may select an individual consumer and/or define a subset of consumers and bid to supply service or services to the individual consumer or that consumer subset.

In one embodiment, consumers' identities are not revealed to suppliers during the bidding process to thereby protect consumers' privacy. In addition, the identity of suppliers may likewise not be revealed to consumers, to keep suppliers' bidding strategies and pricing structure secret.

In still another embodiment, information from the consumer may be collected via a terminal located at a conventional, physical, "bricks and mortar" store. Thus, as similarly described above, consumer data, including preferences and/or usage data, is collected and based at least in part on the preferences and/or usage information, offers and related information may be generated specifically for the consumer. The information and offers may then be provided to the consumer via the store terminal. For example, the consumer may be presented with a list of products and/or services ranked based upon the consumer data. This advantageously allows the store to customize and selectively offer to consumers both products and related services. Based on the ranked list, the consumer can quickly locate and order the most suitable products and/or services. In addition, the store can optionally provide the product and/or activate the related services before the consumer leaves the store.

In one embodiment, a quality of service application helps users select the service provider that offers the most suitable service. For example, one such quality of service (QOS) application aids users select the telecommunications service provider with the most suitable telecommunications infrastructure, including the most suitable placement and density of antennas for the users needs. The customer is asked by the QOS application for information related to the user's present or anticipated service and/or product utilization patterns. For example, with respect to cellular service, the customer is presented with a service area usage form, wherein the customer specifies where the customer intends to use a cellular phone or other similar telecommunications device. The form may be displayed on a touch sensitive terminal installed in a retail site or on a conventional end-user terminal in the user's home or business. The form, by way of example, can include a map of an area of interest.

Major cellular service areas are indicated on the map. Optionally, the name of a city or town located within or adjacent to a given service area may be displayed in conjunction with the service area indicator. The user is asked to select which service areas the customer intends to typically use their cellular phone in. The selected circles are highlighted, filed in, or otherwise emphasized. The user can then submit or verify the selection.

Next, a more detailed map of a first of the selected service areas, and optionally, adjacent areas, is presented. The map may show, for example, the local cities and towns within or adjacent to the selected circled area. With finer granularity, the user can select in which of these local areas the user intends to use the cellular phone in. The selected areas are highlighted, filed in, or otherwise emphasized. The user can then submit or verify the selection or selections.

Once the user selects the local areas of interest, the user can indicate which routes the user typically travels on. The displayed routes can include major and secondary highways, as well as streets, subways, trains, ferries, and other routes. The user can then select or indicate which routes the user typically uses. The selected routes are then further highlighted or otherwise emphasized by changing the color of the selected routes, flashing the routes, outlining the routes in bold, or using other emphasis techniques. The user can then submit the selection or selections. Next, a view of the communication infrastructure, in the form of cellular antenna placement and/or coverage, along the selected routes for different service providers, is provided to the user. The user can then select the most appropriate service provider.

In one embodiment, an infrastructure database is provided. The infrastructure database includes information on the locations and types of infrastructure maintained by a service provider, and other indicators of service area coverage and the quality of service for each service provider. For example, the location and types of cellular antennas maintained or operated by a cellular service provider can be stored in the infrastructure database.

One aspect of the present invention is a method of facilitating the bidding process over a network for the supply of utility services, the method comprising: receiving over a network individual historical utility consumption and use information for corresponding service consumers; generating individual profiles, based at least in part on the historical consumption and use information, for at least a first portion of the consumers; providing over the network information corresponding to the individual profiles to at least a first utility service supplier; receiving a bid from the first utility supplier to supply utility service to at least a first consumer in the first portion of consumers; and providing the bid to at least a first recipient.

Another aspect of the present invention is a method of facilitating the bidding process for the supply of services, the method comprising: receiving historical service usage information for a plurality of consumers; generating individual profiles, based at least in part on the service usage information, for at least a first portion of the plurality of consumers; selectively providing information related to the individual profiles to at least a first supplier; receiving a first bid from the first supplier to supply at least one of a service and a product to at least a first consumer in the first portion of consumers; and providing the first bid to at least a first recipient.

Still another aspect of the present invention is a method of providing consumers with bids from suppliers of utility services, the method comprising: receiving a request for bids for a plurality of utility services from at least a first user over a network; receiving historical utility usage information for at least a portion of the plurality of utility services; providing via the network information related to the received utility usage information to a plurality of bidders; receiving a bid to supply the plurality of utility services from at least a first bidder; and receiving a bid to supply only a portion of the plurality of utility services from at least a second bidder.

Yet another aspect of the present invention is a method of requesting offers to supply utility services to consumers, the method comprising: receiving utility service usage information from a plurality of consumers; generating individual profiles, based at least in part on the utility service usage information, for the plurality of consumers;

providing information corresponding to the individual profiles to at least a first offeror of utility service; and receiving an offer from the first offeror to supply utility service to an aggregated group of consumers, wherein the aggregated group is at least partly selected by the first offeror from the plurality of consumers.

One aspect of the present invention is a method of facilitating the bidding process for the supply of utility services, the method comprising: receiving utility service usage information from at least a first commercial consumer; receiving meter information on a plurality of meters associated with the first commercial consumer; providing data related to the utility service usage information and the meter information to at least a first utility service supplier; and receiving a bid from the first utility supplier to supply utility service to the at least first commercial consumer.

Another aspect of the present invention is a method of generating offers to supply utility services to consumers, the method comprising: providing a first set of offer elements related to providing a first utility service to a consumer; receiving a user selection of offer elements from the first set that are to be included in the offer to the consumer; receiving from the user at least a first value associated with at least a first of the selected offer elements; and providing an offer to the consumer based on at least the selected offer elements and the first value.

Still another aspect of the present invention is a method of requesting offers over to supply services to consumers, the method comprising: generating individual profiles for the plurality of consumers based on information received over a network; providing information corresponding to the individual profiles to at least a first offeror of a first service; and receiving an offer from the first offeror to supply the first service to an aggregated group of consumers, wherein the aggregated group is at least partly selected by the first offeror from the plurality of consumers.

One aspect of the present invention is a method of providing items and related services in a physical store, the method comprising: providing a first terminal in the store; networking the first terminal to a server having an item database and a services database; receiving an indication from a first customer that the first customer wants to purchase a first item-type; receiving profile information related to the first-item type from the first customer using the first terminal; based on the profile information, selecting a plurality of items from the item database corresponding to the first item-type and a plurality of related services of a first service type from the services database; ranking the selected plurality of items and related services; presenting information on the ranked selected plurality of items and related services to the customer on the first terminal; receiving an order for at least one of the ranked selected plurality of items and at least one of the related services; providing the ordered item to the customer in the store; and activating the ordered service.

Another aspect of the present invention is a networked provisioning system, comprising: a first terminal located in a store, the first terminal configured to receive customer profile information and a customer request for information on at least a first item-type; a first computer system configured to receive customer profile information and the customer request from the first terminal, product information over a network from a product provider computer system, and service information over the network from a service provider computer system, wherein the product information is related to the first item-type, and to store the received customer profile information, product information, and service information in at least a first database; a first module stored in the first computer system, the first module configured to select product information and service information and rank products corresponding to the product information and services corresponding to the service information based on at least the customer profile information and the customer request; a second module stored in the first computer system to receive at least a portion of the selected product information, service information, and rankings and to transmit the received selected product information, service information, and rankings to the first terminal; and a third module stored in the first computer system configured to receive an order from the customer for at least a first product related to the transmitted selected product information and further configured to instruct at least a first store employee to provide the ordered item to the customer.

Yet another aspect of the present invention is a networked provisioning system, comprising: a first instruction configured to be stored on a terminal located in a store, the first instruction configured to receive customer profile information and a customer request for information related to at least one of a first product and a first service; a second instruction configured to be stored on a first computer system, the second instruction configured to receive information from the first terminal, including customer profile information and the request for information related to at least one of the first product and the first service; a third instruction configured to receive product information over a network from a product provider computer system, and service information over the network from a service provider computer system, including information related to the at least one of a first product and a first service; a fourth instruction configured to selectively transmit to the first terminal at least portions of at least one of the product information and the service information; a fifth instruction configured to rank at least one of products corresponding to the product information and services corresponding to the service information based on at least the customer profile information and the customer request; a sixth instruction configured to provide ranking information to the first terminal; a seventh instruction configured to transmit an offer of service corresponding to the first product in response to at least one of the customer requesting information on the first product and ordering the first product; and an eighth instruction configured to activate service corresponding to the offered service at least partly in response to the customer accepting the offer.

One aspect of the present invention is a method of correlating telecommunications infrastructure information with user routes, comprising: receiving from a plurality of sources cellular antenna placement information, including latitude and longitude information, for a plurality of cellular antennas in a plurality of regions; requesting, over a network, a user to identify at least a first city and a second city in which the user intends to utilize cellular service; receiving over the network the user city identifications; requesting the user to identify at least a first route on which the user intends to travel from the first city to the second city; receiving an instruction from the user to provide coverage information for a first cellular service provider; identifying, using the antenna placement information, antennas located within a first area through which the first route passes, wherein the antennas are associated with the first cellular service provider; retrieving information related to the coverage of the identified antennas associated with the first cellular service provider; displaying, on a map of the first area presented on a first terminal, area coverage indicators corresponding to the identified antennas associated with the first cellular service provider, wherein coverage gaps on the first route can be identified by the user; receiving an instruction from the user to provide coverage information for a second cellular service provider; identifying, using the antenna placement information, antennas associated with the second cellular service provider located within the first area; retrieving information related to the coverage of the identified antennas associated with the second cellular service provider; and displaying, on the map of the first area presented on the first terminal, area coverage indicators corresponding to the identified antennas associated with the second cellular service provider, wherein coverage gaps on the first route can be identified by the user.

Another aspect of the present invention is a method of identifying telecommunications infrastructure placement, comprising: storing cellular antenna placement information for a plurality of cellular antennas associated with a first service provider in a database; storing cellular antenna placement information for a plurality of cellular antennas associated with a second service provider in the database; transmitting a request over a network to a first terminal, for a user to identify at least a first location in which the user intends to utilize cellular service; receiving over the network the user identification of the first location; transmitting information to the first terminal, including map information for the first location and for related travel routes; requesting the user to identify at least one of the travel routes on which the user intends to travel; identifying the cellular coverage for areas along the at least one travel route provided by the first service provider, based at least upon the antenna placement information for the plurality of cellular antennas associated with the first service provider; transmitting to the first terminal display information indicating the cellular coverage for areas along the at least one travel route provided by the cellular service provider; identifying the cellular coverage for areas along the at least one travel route provided by the second cellular service provider, based at least upon the antenna placement information for the plurality of cellular antennas associated with the second service provider; and transmitting to the first terminal display information indicating the cellular coverage for areas along the at least one travel route provided by the second service provider.

Still another aspect of the present invention is a system for correlating user usage information with a service provider's service coverage, the system comprising: a database configured to store cellular antenna location information for a plurality of cellular antennas associated with a first service provider, and to store cellular antenna placement information for a plurality of cellular antennas associated with a second service provider; at least a first instruction stored in memory configured to transmit a request over a network to a first terminal for a user to identify at least a first location in which the user intends to utilize cellular service; at least a second instruction configured to request the user to identify a travel route at least connecting to the first location on which the user uses cellular service; at least a third instruction configured to determine the cellular coverage provided by the first service provider for areas along the travel route, based at least upon the antenna location information for the plurality of cellular antennas associated with the first service provider; at least a fourth instruction configured to provide to the first terminal information indicating the cellular coverage for areas along the travel route provided by the first service provider; and at least a fifth instruction configured to provide to the first terminal information indicating the cellular coverage for areas along the travel route provided by the second service provider.

BRIEF DESCRIPTION OF THE DRAWINGS

FIG. 3 illustrates an exemplary Web site page registration form;

FIGS. 5A–B illustrate residential account information forms;

FIGS. 6A–C illustrate commercial account information forms;

FIGS. 9A–C illustrates another embodiment of a set of registration forms;

FIG. 10 illustrates one embodiment of a supplier offer configuration form;

FIG. 11 illustrates one embodiment of a form used to edit offer elements;

FIG. 12 illustrates one embodiment of a record of offer types;

FIG. 13 illustrates one embodiment of a record of offers made;

FIG. 14 illustrates one embodiment of a display of multiple offers made to a consumer;

FIG. 15 illustrates one embodiment of a display of offers made to a consumer;

FIG. 19 illustrates an example form used to enter user profile information for telecommunications products and services;

FIG. 33 illustrates an example database display form.

DETAILED DESCRIPTION OF PREFERRED EMBODIMENTS

Figure 1:
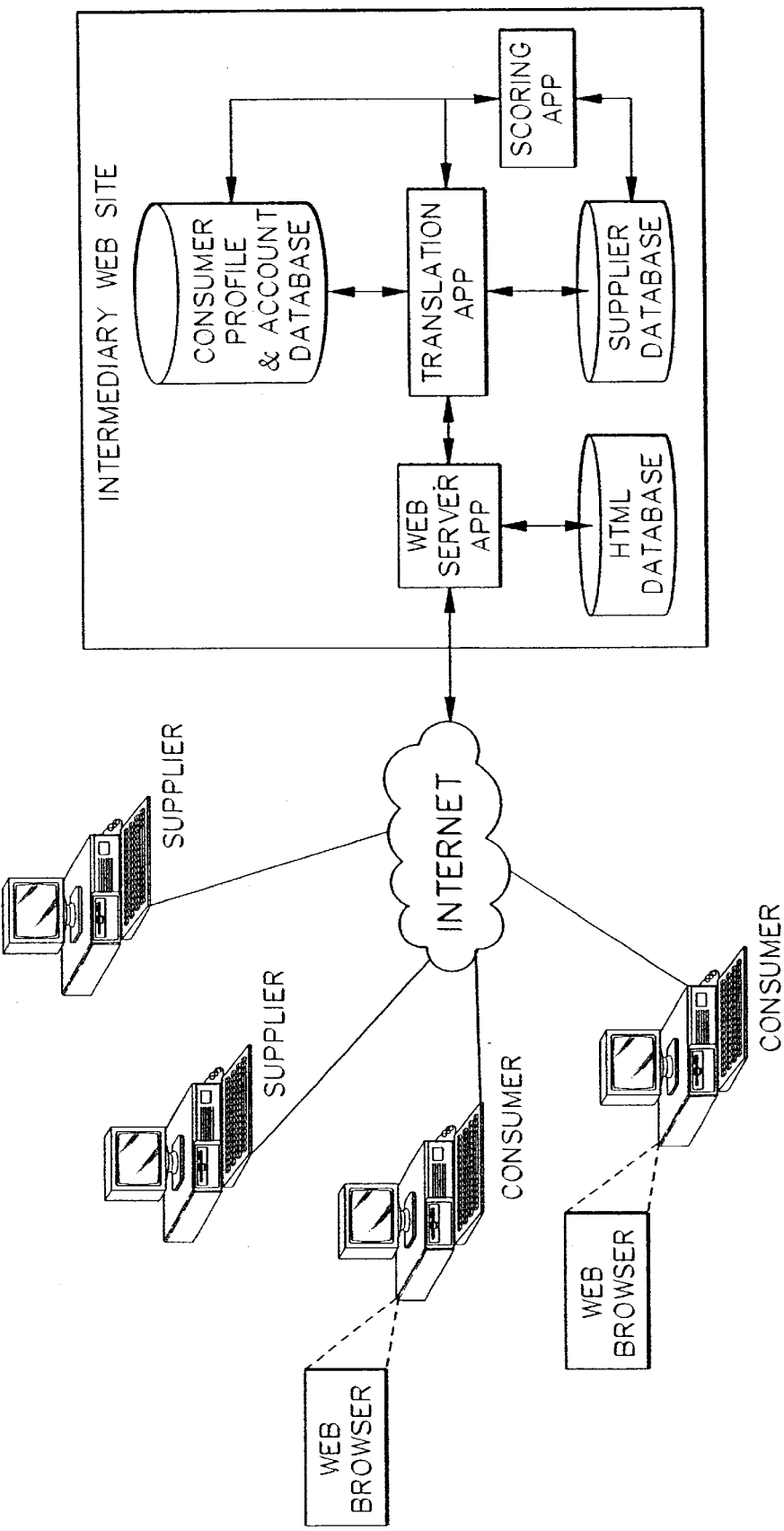
FIG. 1 illustrates an exemplary networked system, including Web components for implementing a consumer/supplier market system in accordance with one embodiment of the invention and illustrates typical user components for accessing the system.

The present invention is related to methods and systems for facilitating transactions involving goods and services between suppliers and consumers of services, such as telecommunication services, utility services, and associated services.

One embodiment of the present invention provides utility suppliers with information related to consumers of utility services or products, such as electricity, gas, water, telecommunication services (including, but not limited to wireless services, cellular services, paging services, and wired phone services), cable, broadband services (including, but not limited to ADSL, DSL, T1, satellite, and cable services), heating oil, and other related products and services. Based on the consumer information, one or more suppliers may generate offers to provide the products and services to consumers, which are then provided to the consumers. More generally, one embodiment of the present invention may be used to facilitate deals between suppliers and purchasers of products and services, where the price of the products or services are based at least in part on a given customer's characteristics or preferences. These customer characteristics may relate to, by way of example, the customer usage of a product or service, such as customer's usage amount, usage location, and time of usage, and/or to financial characteristics, including credit worthiness, payment history, assets, debt, and related characteristics. Such products and services may include leases, mortgages, insurance, investment instruments, and the like.

Advantageously, one embodiment of the present invention acts as a neutral market maker for such services and products, allowing consumers and suppliers, such as utility suppliers, to be better and more efficiently matched via an offer and acceptance process. Thus, retail customers, such as consumers, including residential and commercial consumers, can realize savings by obtaining lower priced utility or other services, and utility providers, as well as other providers, can obtain new customers and enter new markets.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically-distributed computer systems that are appropriately linked together. Furthermore, while the following description relates to an embodiment utilizing the Internet and related protocols, other networks, such as networked interactive televisions, and other protocols may be used as well. In the figures, words and phrases are underlined to indicate a hyperlink to a document or Web page related to the underlined word or phrase. In addition, unless otherwise indicated, the functions described herein are preferably performed by executable code, including instructions, running on one or more general purpose or computers or on servers. The term retail consumer, as used herein, refers to consumers or end users of a given product or service. The term wholesaler, as used herein, refers to entities that purchase goods or services for resale to others.

As will be discussed in greater detail below, one novel aspect of the present invention is a process of individually evaluating and generating a profile of consumers, such as consumers of utility services or telecommunication services, based on their historical usage information, geographic location and and/or their credit or payment history. A code or identifier reflecting and summarizing the consumer's profile is generated. A provider, such as a utility supplier, may advantageously define or select an aggregated group of consumers, such as residential or commercial consumers, based on each consumer's individual profile or code, and then bid to provide services and/or products to the provider-defined group. Optionally, the provider may elect to bid to provide services and/or products to individual consumers. This contrasts with conventional systems, wherein providers are typically limited to deciding whether or not to bid to provide services and/or products to individual consumers or a group defined or aggregated, for example, by a third party, but have no say in defining the group.

In one embodiment, the bidding may be a "blind" bidding process. For example, consumers' identities are optionally not revealed to suppliers during the bidding process to thereby protect consumers' privacy. In addition, the identity of suppliers may likewise not be revealed to consumers, to keep suppliers' bidding strategies and retail pricing secret.

By way of example, if a consumer wants to participate in the consumer/supplier market place system in accordance with one embodiment of the present invention, the consumer may register at a Web site associated with a neutral manager of the consumer/supplier market system. The consumer may be asked which of several services, such as utility services, including electricity, gas, water, telecommunication service, cable, broadband service, heating oil, and/or other products and services, the consumer wants suppliers to bid on, and whether the consumer is a residential or commercial entity. The consumer may select one or more of the services and/or products. The consumer is then presented with one or more forms asking for information that will be used to build the consumer's profile for a selected service. Different forms may be provided for residential and commercial users.

For example, both commercial and residential consumers may be asked to identify the consumer's present supplier, such as an incumbent electricity supplier. Based on that identification, a form similar in appearance or having similar energy usage and billing fields as the consumer's present supplier's bill template is presented. The consumer is then asked to fill in the information corresponding to blank fields using existing incumbent provider bills as a reference. For example, the consumer may be asked to provide address information and monthly utility usage information for the past year using the same format as the present supplier's bill. Some bills may include not just the monthly usage data, but also the usage during peak periods, such as 9:00 to 5:00, and the usage during off-peak periods. This information is useful to providers in deciding how much and whether to bid to provide the consumer with a utility service, because prices often vary for services, such as utility services, based on time of use, location of use, and quantity of use. The consumer may also be asked to provide the rates charged by the consumer's current supplier.

The consumer may key in usage data and other requested data manually, or may provide authorization to the system manager to obtain the usage information and some of the other requested data from the consumer's present or incumbent provider. If such authorization is provided, usage, rate, and other data may then be electronically uploaded from the incumbent provider, thereby relieving the consumer of having to enter the data and ensuring better accuracy. If, instead, the consumer elects to enter the data manually, the consumer may be asked to provide confirming evidence, such as copies of past bills, within a predetermined time period of registering, such as 30 days.

Other information related to the service and/or product may be requested as well. For example, for electricity and/or natural gas service, residential consumers may be asked how many people live at the residential address, how many people are at home during different periods of the day (i.e., 8:00 AM to 5:00 PM, 5:01 PM to 11:00 PM, 11:01 PM to 7:59 AM) for weekdays and for weekends. In addition, energy consuming appliance information may be requested. For example, the consumer may be asked whether she or he has central air-conditioning, central heating, window air-conditioning units, area heaters, washing machine, clothes dryer, stove, and/or a dishwasher. The consumer may be requested to specify the thermostat-type for both central heating and air-conditioning units. In addition, the form may ask whether the appliances are gas or electric, and the appliance make, model and/or year. The consumer may also be asked whether there is a pool, hot tub, barbecue, and so on at the residence and how and/or when they are heated or powered. In addition, the consumer may be asked to indicate whether the residence is an apartment, a house, one story or two stories, and rented or owned. Information related to insulation, such as the type of insulation, if any, how many windows the residence has, and whether the windows are single paned, double paned, or triple paned windows, may be requested. The consumer may also be asked to what thermostat setting the heater is set for in the winter and to what thermostat setting the air conditioner is set for in the winter.

Optionally, with respect to electricity, the consumer may be allowed to specify whether he or she prefers or requires that the electricity be generated using alternative energy sources, such as solar, geothermal power, or non carbon-based fuels, or whether the lowest cost provider is preferred. In addition, the consumer may optionally be allowed to specify whether the consumer would like to have his utility needs or load aggregated with other consumers' loads. Generally, aggregated groups are more attractive to suppliers, and so suppliers may provide lower rates or other benefits to aggregated groups as compared to single consumer with a much lower consumption of utility services and/or products.

If the consumer is to be charged a fee upon accepting an offer, then in one embodiment, the consumer may elect to have that fee charged on the first supplier generated utility bill. The supplier then will forward that fee to the consumer/supplier market system owner. Alternatively, the consumer may elect to have the fee billed to a credit card or other funding source.

Figure 7:
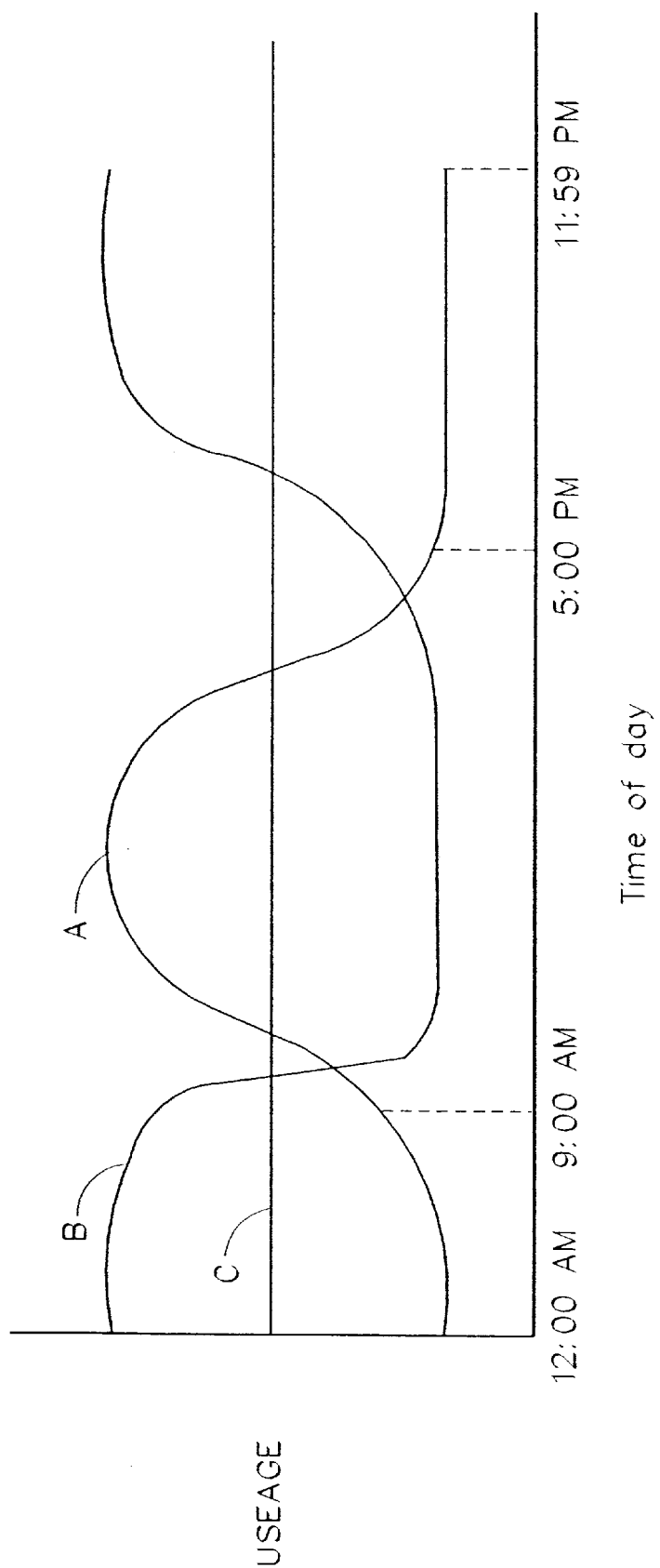
FIG. 7 illustrates three exemplary statistical load profiles corresponding to three energy consumers.

The requested information may then be used to build a very descriptive residential consumer profile, giving suppliers an accurate picture of the consumer's historical and anticipated use and consumption patterns. This allows suppliers to give correspondingly more accurate bids or quotes to provide the requested utility service and/or product and to better aggregate a number of consumers having similar or complementary desired characteristics, such as statistical load profiles. For example, an electricity or natural gas supplier may want to select a mix of consumers, including some whose peak usage is during the day, some whose peak usage is at night, and some whose usage is fairly constant, so that the overall or aggregate usage load of the consumer subset is approximately constant throughout the daily cycle. Such load profiles are illustrated by curves A, B, and C in FIG. 7. In addition, the information may be used to generate advice for the consumer on how to use the energy service and/or product more efficiently. A fee may be charged for such advice. As will be described below, this advice may be provided by the utility supplier, matching service manager, traditional energy services company (ESCO) and/or independent utility auditor. Further, this information may be used to target appropriate advertisements to the consumer, such as advertisements for more efficient appliances, for insulating services and/or products, and so on.

For commercial users, different and/or additional information may be requested as compared to residential users. For example, the commercial consumer may be asked what type of commercial activity (i.e., restaurant, retail outlet, business offices, light manufacturing, heavy manufacturing, computer center, telecom transmitters, etc.) is being conducted. Further, commercial consumers may be asked if they have more than one service account address, and what those addresses are. The commercial consumer may be asked to specify peak, mid-peak, and off peak usage times, amounts, and current supplier's rates for different seasons, such as during winter or summer. The form may request information on current customer charges, energy credits, and revenue cycle services credits.

In addition, the commercial consumer may be asked how many people are employed at corresponding sites, how many people are working each shift, whether and when there are planned site shut-downs, whether the facility is owned or leased, the rentable square feet, the make and model of the HVAC (heating, ventilating, and air conditioning) system. The consumer may also be asked whether the site or sites are affiliated with a chain, trade or other association which may be entitled to special pricing.

In the case of a metered service, such as electricity or natural gas, the consumer may be asked how many meters are associated with the commercial service account, the billing address and location of each meter, the meter type (interval, time-of-use, etc.), rate class, and/or meter read dates. The commercial consumer may also be asked whether the consumer wants a site bill, that is a separate bill for each meter, or a consolidated bill for all meters, and how often the consumers want to be billed. The consumer may be notified that interest charges will accrue for bills for sites that are delayed from a normal billing cycle more than a predetermined amount, such as 3 days. The consumer may be allowed to specify whether commodity and non-commodity charges should be consolidated on a single bill.

Different forms with different and/or additional questions may be provided for different types of services and/or products. For example, for consumers seeking bids to supply their Internet bandwidth needs (such as by DSL, ADSL, cable modems, satellite, interactive TV, etc.) the consumer may be asked how many computers and other networkable appliances the consumer has, how many e-mail accounts the consumer has, periods of heaviest and lightest usage, whether and how often the consumer downloads streaming video and/or audio, and so on. For consumers seeking offers to supply their telecom needs, the consumer may be asked how many fixed phones, portable phones, cellular phones, and pagers the consumer has, and what special services, such as call-waiting, caller ID, and call forwarding, the consumer uses or wants, and times of heaviest usage. For consumers seeking offers to supply their car lease needs, the consumer may be asked for information related to the consumer's income, assets, current lease provider, payment history on a current lease and/or on other loans, the consumer's driving habits, including mileage per year information, and the like.

In another embodiment of the present invention, information from the user may be collected via a terminal located at a conventional, physical, "bricks and mortar" store. Rather than rely on having customers log on to their computer and find an appropriate e-commerce web site, customers can go to their familiar, trustworthy physical retail stores. The store acts as a collection point for potential customers. As similarly described above, the store terminal collects user data, including the user's membership, if any, in an affinity group which has contracted with an independent entity that licenses, operates and/or manages the system, including the terminal or who has contracted directly with the store, preferences and/or usage information, and based at least in part on the affinity group membership, preferences and/or usage information, offers and related information may be provided to the user.

The store terminal may be managed by a separate entity which has contracted to provide the terminal and/or related services to the store in exchange for a percentage or fixed amount for sales made using the terminal. The separate entity coordinates collecting the user information, product information, and service information, and processes the information and provides the processed information appropriately to the store, product vendors, service vendors, and customers. For example, the information and supplier offers may then be provided to the user via the store terminal. Once the user selects products and services to purchase, the product fulfillment is performed by the store. This advantageously allows the store to associate and offer to consumers both products and related services and to participate in the fulfillment phase of purchases, without having to manage relationships with vendors and related service providers. In particular, the related services may be those needed to use the product, such as energy sources, wireless services, or other telecom services.

For example, a user may request information related to an appliance-type, such as refrigerators, using the terminal. The terminal may be a fixed, wired terminal, a handheld wireless terminal, the consumer's own phone or wireless personal digital assistant (PDA), or other networkable terminal.

Using the terminal, the user may specify preferences, such as the type of refrigerator desired and the desired characteristics. By way of example, the user may specify, using an appropriate form presented on the terminal display, whether the user wants an ice maker included, the desired location of the freezer (top, bottom, or on the side), whether an ice water tap is desired, and so on. In addition, other usage-related questions may be asked of the user. For example, in order to better determine the refrigerator size appropriate for the user, the user may be asked how many gallons of milk, soda, or other liquid is typically stored in the refrigerator at a time. Similarly, the user may be asked how much frozen meats are stored in the freezer. In response to the user preferences and/or usage information, a store server or server managed by a separate entity, transmits to the store terminal information on the available refrigerators whose characteristics match the user-specified preferences and/or usage information. The information may be provided in a ranked form, with the order or other designator used to indicate which products most closely match the user preference and/or usage information.

The provided information may include make, model number, price, dimensions, storage capacity, energy efficiency, location in the store (aisle number or other designator), available colors and/or inventory status for one or more refrigerators. Further, in one embodiment, the user is offered related services. For example, in the case of a refrigerator, the user may be offered electricity service. Optionally, the user may be presented with several service plans from one or more electricity suppliers. In association with the service plans the calculated energy cost savings for the selected refrigerators is provided. Thus, the user is presented in real-time with current information on the desired product is able to make an informed decision regarding the product as well as regarding the associated offered services. Optionally, user electricity usage information and geographical locations may be requested so that suppliers can bid to supply services as similarly discussed above.

Of course the present invention is not limited to offering information regarding refrigerators and electricity. Rather, the present embodiment is directed generally to selling goods and related services. Thus, the user may obtain information regarding other products and services which may be procured from or via the store. For example, as similarly described above with respect to the refrigerator example, in order to select and purchase a gas range, the user may provide user preference and/or usage information and in response obtain information on an appropriate gas range and be offered information on different gas suppliers. The user may then independently purchase the desired gas range and select and contract to receive the desired gas service.

By way of another example, the user may specify via the store terminal characteristics related to a desired computer configuration. In response, in addition to receiving the information regarding the various corresponding computers available via the store, the user may be offered a variety of related services and plans. For example, the user may be offered one or more broadband or internet services plans from one or more suppliers.

In still another example, with respect to cellular phones, a user may be asked, via the terminal, to indicate whether the user is a member of a contracted-with affinity group, and to specify preference information, such as a desired phone model and/or manufacturer, and/or usage information, such as the user's address or zip code, how often the user travels out of the geographical area or region where the phone will be activated, how often the user travels out of state and to which states, how often the user travels out of the country and which countries, whether the user currently has or desires text message or web access, whether the user wants call features such as caller identification, conference calling, call forwarding, and call waiting, the desired color, approximately how many call minutes the user typically utilizes during daily peak periods (8:00 AM to 6:00 PM, for example), approximately how many call minutes the user utilizes during off-peak periods (6:01 PM to 7:59 AM, for example), approximately how many call minutes the user utilizes on weekends, who is the user's current cellular service provider, how many current cellular accounts the user (or the user's business or family) has, whether the user has a page account and who with, and so on.

FIG. 19 illustrates an example form used to enter user profile information for telecommunications products and services, such as for a cellular phone and phone service. For example, the user or customer is asked to provide zip code information, select the level of service desired, and the desired coverage area. The customer is also asked historical and future usage information, such as the identity of the customer's current service provider, the desired technology (PCS, TDM, CDMA), if any, the customer's preferred handset choice, if any, how many calls the customer expects to make for a given period of time, such as per week, the expected call duration, the time of day the customer most frequently makes calls, the approximate amount the customer expects to spend per month, and the percentage calls that are long distance calls. In addition, the customer is asked on the form if he or she is interested in related products and services, such as ISP services, long distance services, and phone accessories.

The customer is also asked what service plan and phone features the customer desires. The customer is requested to identify whether the customer is a member of a group that is entitled to a special plan, plan price, or discount. Further, the customer is asked what is the desired contract duration, whether the customer would consider purchasing from a reseller, whether the customer would consider paying the bill online, and to indicate the relative importance of price and quality. The customer is also requested to indicate with the user is interested in receiving information on other services, such as ISP services, local and long distance phone service, and on handset related accessories. The customer then submits requested information.

Based on the provided affinity group membership, preference and/or usage information the user is presented with a selection of ranked phones, their inventory status and available corresponding cellular service plans. The services plans may be predetermined or may be dynamically automatically generated by the service providers or authorized representatives thereof based on the user's preference and/or usage information. The offering of phones and/or services may be customized for members of certain affinity groups in accordance with agreements made with those affinity groups. In addition, or alternatively, affinity group members may be offered discounts on standard offerings of phones and/or services. Of course such customization for affinity group members and the like can also be provided to purchases made directly online, rather than in a physical store. Once the user selects the desired service plan and phone, the in-store inventory is automatically checked to determine if the phone is in stock. If the phone is not in stock, the user is so informed and a predicted date when the phone will be in stock is provided. The user then has the option to proceed with the order or to select another phone.

In addition, the user may be presented with information on related products or services. For example, the system may suggest a hands-free unit, an additional battery, a carrying case, and the like compatible with the selected phone. Similarly, the user may be presented with an extended warranty plan for the phone. The user can then select the desired phone, service, and related products and services. If the user was not satisfied with the selection of phones and service plans, the user can alter the user's profile information so emphasize certain characteristics related to the desired features for the phones or service plans.

In one embodiment, once the user selects a phone and service plan, the user provides payment information, such as credit card information. The credit card information may be manually entered and/or entered by swiping the card using a card reader device that reads the information stored on the magnetic strip typically found on credit cards. The payment information is processed, and if verified, an order is automatically placed with the service provider for the ordered plan. In addition, a printer associated with the terminal prints out a receipt which the user takes to a store representative, which may be clerk at an in-store pick-up counter. The store representative retrieves the selected phone from a store storage area and provides the phone to the user. The phone and associated plan may be activated in response to a directive provided by the store representative or in response to the user calling a predetermined number. If the phone is not in stock, an order is automatically placed with a warehouse or supplier wherein the phone is available for the phone to be delivered to the store. Once the phone is available at the store an e-mail message is sent to the user informing the user that the phone is ready to be picked-up. The user then goes to the store to pick up the phone. Alternatively, the user can request that the phone be delivered to the user.

In addition, if the user is a member of an appropriate affinity group, the affinity group will receive an agreed upon benefit for the sale, which may include a percentage of the sale, a fixed dollar amount per sale, and/or additional discounts for the affinity group. This encourages affinity groups and the like to refer business to the store, potentially greatly increasing sales.

In one embodiment, rather than provide payment information using the terminal as described above, the terminal prints out an order form including one or more bar codes indicating the phone and service plan desired by the user. In addition, the order form may include offers for related products and services, including corresponding bar codes and/or SKU numbers. Further, if the user is a member of an appropriate affinity group, the order form may include a discount bar code or coupon corresponding to a discount offered to members of the affinity group. The user takes the order form to a cash register operator or other store representative who scans the appropriate bar codes, whereupon the register calculates the total order cost, including any related taxes. The cash register operator receives payment, via credit card, cash or otherwise, and provides and activates the phone. Thus, the user advantageously leaves the store with an appropriate activated phone and service plan. If the phone is not in stock, the user can specify the delivery method and have the phone shipped to an address specified by the user.

In addition, in one embodiment, the user places an order for an item, and optionally payment information, using their home computer or other remotely located terminal via a Web site operated by the store or by a third party affiliated with the store. The in-store inventory is checked to determine if the item is in stock. If the item is not in stock, the user is so informed and a predicted date when the item will be in stock is provided. The user then has the option to proceed with the order. If the user elects to proceed, the user receives an order confirmation form including a unique order number which the user prints out. In addition, if the item was not in stock an order to have the item delivered to the store is placed with a warehouse or supplier wherein the item is available. Once the item is available at the store, an e-mail message is sent to the user informing the user that the item is ready to be picked-up. The user then goes to the store to pick up the item. Alternatively, the user can request that the item be delivered to the user.

Figure 17:
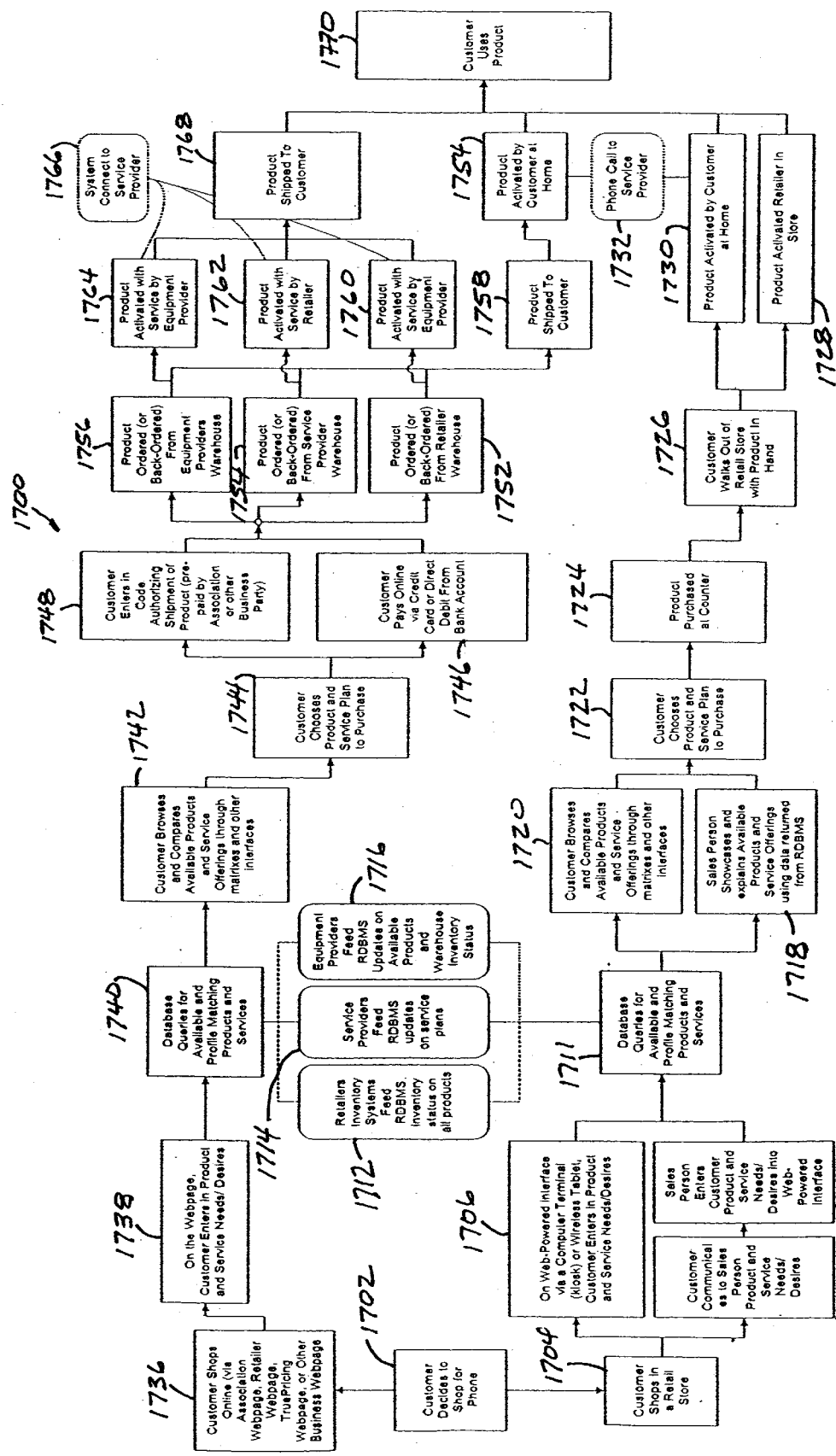
FIG. 17 illustrates an example method of a purchase process.

FIG. 17 illustrates one example process or method 1700 of a purchase process in accordance with an embodiment of the present invention, including the purchase of a wireless phone and related service. At state 1702, the customer can elect to shop for a phone either by visiting a retail "bricks and mortar" store, or via an online site. If the customer decides to shop in a retail "bricks and mortar" store, the process 1700 proceeds to state 1704. Then the customer can elect to shop for the phone via an online terminal at state 1706, and enters in profile information, such as product service needs and preference information. Otherwise, at state 1708, the customer can provide the information to a sales person or other customer representative, who at state 1710, enters the customers product and service needs and preferences into the online terminal.

At state 1711, a database query is made to locate available profile matching products and services. The query request is transmitted to the retailer's inventory system's feed 1712 to determine the status of matching products. Similarly, the query request is transmitted to the service providers' feed 1714, which provides information and updates on service plans, to locate matching service plans. In addition, the query request is transmitted to the equipment providers' feed 1716, which provides information and updates on available products and warehouse inventory status, to locate and determine the status of matching products. This information is returned to the terminal. If the customer is directly utilizing the online terminal, then at state 1720, the customer browses and compares available products and services on the terminal. Otherwise, at state 1718, the sales person accesses the information from the terminal and explains the product and service offering to the customer. The customer chooses which service plan and product to purchase at state 1722. The customer purchases the product at a sales counter or station at state 1724. At state 1726, the customer leaves the retail store with product in hand. The customer can activate the phone at home, state 1730, via a phone call to the service provider at state 1732. Alternatively, at state 1728, the phone can be activated in response to an action by the retailer, such as by sending a communication to the service provider. The customer can then use the phone in a typical manner at state 1770.

If the customer decides to shop on an online site using a remote terminal or the like, the process 1700 proceeds from state 1704 to state 1736. The online site may belong to a professional or business association with which the customer is affiliated, a Web site of the retail store, an intermediary that manages the vendor-to-retailer-to-customer sales and provisioning processor, or other e-commerce Web site. At state 1738, the customer enters product and service needs and preferences into an appropriate form, such as that illustrated in FIG. 19. At state 1740, a database query is made to locate available profile matching products and services, as similarly described above with respect to state 1711. At state 1742, the customer browses and compares available products and services on the remote terminal. The customer chooses which service plan and product to purchase at state 1744.

The customer can elect to proceed to either state 1746 or state 1748. At state 1746 the customer pays online via credit card or via direct debit from a bank account. At state 1748, the customer enters an authorization code authorizing shipment of the product to a designated address. An association or other business party may have prepaid the payment. The ordered product is either ordered or backordered from the equipment provider's warehouse at state 1756, the service provider's warehouse at state 1754, or from a retailer's warehouse at state 1752. The product can be activated at state 1764 by the equipment provider, at state 1762 by the retailer, or at state 1760 by the equipment provider. The product is then shipped to the customer at state 1768, and the system connect to the service provider is performed 1766. Alternatively, at state 1758, the product is shipped to the customer before activation. Once received, at state 1759, the customer can activate the phone at the customer's home or office. At state 1770, the customer then can use the product.

In addition, in one embodiment, the terminal can be used to purchase and download to the phone various desirable items, such as new ringer tones, images or icons to be displayed on the phone display or intended to be sent from the phone to other phones, games, application programs, and the like. Further, the phone may include features, such as a Bluetooth interface circuit or General Packet Radio Service, which is initially not enabled or for which the phone lacks the appropriate driver software. At the discretion of the retailer or provider, such un-enabled features can be enabled either for an additional fee or for no charge via the terminal. The items may be downloaded or features enabled via a cellular network or other wireless technology, such as using the Bluetooth standard, or via an infrared IRDA interface, if so supported by the phone. Alternatively, the terminal may include a physical docking port, including a connector, which connects to a mating connector on the phone.

In addition, in one embodiment, the terminal may be used to download to the user's wireless phone or personal digital assistant, such as a Palm VII PDA, information about items in the store. As the user roams the store and comes in physical proximity to an item, a code associated with the item is transmitted from a local transmitter having a short range to the phone or PDA and the related downloaded information is then displayed on the phones or PDA's screen. Via a menu presented on the screen, the user can then elect to purchase the item and specify whether the item is to be delivered to the user's home or other remote location, or if the user wants to pick the item up from an in-store pickup counter.

The novel system described above contrasts with conventional methods of selling phones and services in physical stores. With many conventional methods, a user typically is provided with separate brochures describing predetermined service plans and phones. Thus, the user has to laboriously read through many brochures to decide what phone and service plan to purchase. Some stores also provide a representative to describe the available plans and phones. However, these representatives often provide inaccurate information, and are often difficult to locate or talk to during peak store periods. Further, the phone is typically still unactivated when the user leaves the store with the purchased phone. After leaving the store, the user then needs to place to call using a different phone to a designated service provider, whereupon the user selects a service verbally described by a provider representative and once again provides payment information, in the form of credit card information and/or a billing address. Only then is the phone and service plan activated.

In another embodiment of the present invention, providers or suppliers may be allowed to bid on a bundled set of needs, such as several utility services, for one or more consumers. For example, in one embodiment the provider can selectively bid to supply one or more consumers with electricity, gas, and/or telecommunication services and/or products. This flexibility allows the provider to better generate an offer with competitive prices and thereby provides consumers with lower overall lower costs.

The consumer may optionally be required to pay a fee to participate in the matching service, and/or upon the consumer accepting a bid from a supplier. To better ensure payment is made by the consumer, the consumer may be asked to supply credit card information, a bank account number, and/or other funding sources. Optionally, the consumers credit history and/or timeliness of utility payments may be checked via TRW, Dun & Bradstreet, and/or the incumbent provider before the consumer is permitted to participate in the matching service.

The information provided by the consumer and/or the consumer's incumbent provider is advantageously translated into a common format that lets information from a plurality of consumers be efficiently compared and evaluated. Based on the profile information provided by the consumer a consumer "score" is generated. In one embodiment, this score is a "grade" or numeric score generated by comparing the consumer's historical consumption profile with that of hypothetical profile or a hypothetical "preferred consumer." The further the consumption profile is from that of the hypothetical preferred consumer, the worse the score or grade. The hypothetical profile may be generated based on surveys taken of utility service providers.

For example, for many utilities the hypothetical "preferred consumer" may be a consumer whose peak usage period is at the time when overall usage of that utility by other consumers is at low point. In addition, the "preferred consumer" may be one who consumes large amount of the utility service, allowing the utility supplier to provide that service more cost effectively. Different usage characteristics may be weighted and combined to produce an overall grade or score. Thus, the grade may be an "A," "B," "C," "D," or "F." If a numeric score is used, numeric score may be on a scale of 1 to 10, where 10 is the highest rating and 1 is the lowest rating.

In another embodiment, rather than providing a grade or score, a code may be generated that summarizes all or part of the consumer's profile, such as historical use and consumption information, permitting consumers having specified characteristics to be more quickly and efficiently located or identified. Thus, for example, an alphanumeric 10 character code for an electricity consumer may be generated as follows:

| Character Position | Function | Code |
| --- | --- | --- |
| 1 | Indicate if commercial or residential | C = Commercial<br>R = Residential |
| 2–6 | Zip code | 5 digit zip code |
| 7–9 | Consumer's Statistical Load Profile | 000–999<br>(1 thousand possible statistical load profiles) |
| 10 | Credit worthiness | A–F<br>("A" is best, "F" is worst) |

The consumer's statistical load usage may be examined and categorized as falling into a predetermined category. The 10 digit code discussed above allows up to 1000 categories of statistical load profiles, ensuring that a given category accurately represents the consumer's usage patterns. The code may be extended to include all or some of the other profile information, such as the number of meters associated with the account.

In one embodiment, a consumer's profiles for multiple corresponding utilities or other products and services may be included in a single code. For example, the 10 digit code discussed above may be extended to a 22 digit code, where digits 11–13 are used to identify a usage profile for telephone services, digits 14–16 are used to identify a usage profile for DSL services, digits 17–19 are used to identify a usage profile for water services, and digits 20–22 are used to identify a usage profile for natural gas services. Use of a single code, rather than separate codes for each utility service, may be used reduce system memory requirements and to may make it easier for suppliers to define an aggregated group for several product and/or service lines. In another embodiment, separate codes may be used for each utility-type.

A consumer's code may be dynamically updated to reflect changes in the consumer's profile information. For example, in one embodiment, once the consumer registers, the consumer's monthly utility usage information is uploaded from the consumer's present supplier. This information may be used to assign the consumer a different statistical load profile and correspondingly update the consumer's profile code or score. In another embodiment, the consumer may be asked to manually update the profile information on a periodic basis, or each time the consumer requests new bids for a given utility service.

Once the consumer's profile has been generated and a code or score produced, the profile and score/code are stored in a consumer profile database in a consistent format. Suppliers can then select consumers having certain profiles and bid to supply utility services and/or products to those consumers. In one embodiment, using a search engine or browser, the suppliers may be allowed to search through the consumer profile database, with identifying information, such as name and address, optionally filtered out, to select the consumers. In one embodiment, the supplier is charged a fee for having access to the database and may be charged an additional fee for each search. The supplier may also be provided database access and/or the search for free. The supplier may initiate the search using an SQL database query or via a form. In addition or instead, the supplier may be allowed to specify one or more codes or a range of scores, such as consumers with greater than a 7 rating, corresponding to an aggregation of consumers to which the supplier wants to bid to supply services. The supplier may also be presented with graphical representations, such as a graph, bar chart, or pie chart, of consumers' usage patterns. This greatly reduces the amount of effort on the part of the supplier needed to identify and select a desired aggregated group of consumers. In exchange, the supplier may optionally be charged a fee higher than the first fee.

Different suppliers may thus define different aggregated groups across one or more product or service lines for which they are bidding to supply service. Thus, one supplier may bid for an aggregation of consumers whose peak utility usage is between the hours of 3:00 AM to 8:00 AM, and another supplier may bid for an aggregation of consumers whose peak utility usage is between the hours of 11:00 PM to 4:00 AM. In this example, there is some overlap, that is, some consumers will fall into both aggregated groups, and thus may receive two bids from the two suppliers.

Optionally, the suppliers may be asked to provide standardized terms so that consumers can better compare the offers. Thus, for example, while the rates offered by the suppliers may differ, many or all of the other terms, such as contract lengths, cancellation policies, warranties, and so on, are the same. In another embodiment, suppliers may provide a combination of standardized terms and supplier specific terms. Thus, for example, a supplier may agree to offer standardized warranties, but non-standard cancellation policies. This allows consumers to easily compare many terms, while still providing the supplier the option of offering some customized terms. In yet another embodiment, in addition to or in place of the two previous options, the supplier may elect to provide its own contract, without using standardized terms as defined by the consumer/supplier market system manager.

In addition, the consumer/supplier market system may dynamically score and/or rank the suppliers offer based both on the offer terms and the consumer's historical use and consumption profile. The scores and/or rankings for the suppliers' bids may then be presented on a dynamically generated Web page to the consumer, with those having better rankings being presented at the top of a list of bidders and those with lower rankings being presented lower on the list. The score or ranking may take into account the supplier's rates for various daily time periods, the contract length, cancellation fees, service quality the consumer's peak usage periods, the consumer's desire for alternative energy sources, and so on. The bids may be evaluated to predicate the cost to the consumer over a period of time, such as a year, based on the consumer's usage information. The score may then be set equal or related to the amount of predicted savings over the previous year's costs. Because the user's profile is taken into account, different consumers may receive different scores for the same offer from the same supplier. For example, an offer to supply electricity at a given rate may be a good offer for a consumer whose peak usage is between 9:00 AM and 4:00 PM, but that same rate may be a poor or expensive rate for a consumer whose peak usage is at night or during some other period.

In one embodiment, offers may be provided individually with customized terms to consumers, where the consumer indicated that he or she did not want to participate in an aggregated group.

Once the offers are provided to the aggregated groups of consumers as defined by the suppliers, different group members may select different suppliers, or no supplier at all. Thus, the number of consumers accepting an offer may not be the same number as those in the aggregated group to which the offer was provided. Therefore, in one embodiment, the supplier may make the offer contingent on having a minimum number or percentage of consumers to whom the offer is made accept the offer. For example, the supplier may make the offer contingent on 75% of the offerees accepting the offer. In addition, in one embodiment, providers may optionally be allowed to bid to provide services and/or products to an individual consumer, rather than an aggregated group.

Additionally, the offer to each consumer may be contingent on the consumer's usage profile remaining substantially the same as a specified benchmark period. For example, the supplier may contractually maintain the ability to charge a fee, cancel or renegotiate the contract and/or change utility rates if the consumer's utility usage between the typical peak hours of 9:00 AM to 4:00 PM increases by more than 15% over the previous year.

As previously discussed, the consumer's profile information may advantageously be used not just to supply the consumer with utility services and/or products, but may be used to provide valuable information on how to decrease utility usage and/or costs. Related advertisements for goods or services which may be further used to reduce utility usage or costs may be presented to the consumer. The owner or operator of the consumer/supplier market system may charge fees for the advertisements, as well as fees for the sale of goods or services sold as a result of the advertisements.

For example, if the consumer's profile indicates the consumer has an electric water heater with certain operating specifications, the consumer may be advised that replacing the electric water heater with a gas water heater would reduce the consumer's energy costs by a specified dollar amount or range per year. Advertisements for gas water heaters may be presented to the consumer. These advertisements may be linked such that when a consumer clicks on or otherwise activates the link, the consumer is presented with detailed information, including efficiency information, on the water heater and is given the opportunity to purchase the water heater. The owner or operator of the consumer/supplier market system may charge the advertisers a fee each time the advertisement is presented. An additional fee may be charged if the consumer actually activates the link. Further, if the consumer purchases the water heater, still another fee may be charged. Similarly, if the consumer has an electric powered heater or dryer, advertisements may be provided for gas powered heaters or dryers.

By way of another example, if the consumer's profile indicates that the consumer's residence has only single paned windows, the consumer may be presented with advertisements for double paned windows. In yet another example, if the residence lacks insulation, advertisements may be provided for insulation installers. In addition, the consumer may be advised that by operating certain appliances, such as a pool pump, at night instead of during the day, the associated energy costs will be reduced. The consumer may optionally be charged a fee for such advice.

Advertisements or offers for the services of an energy auditor or ESCO may also be presented to the consumer. Energy efficiency auditors typically examine a consumer's residence or facility, and provides recommendations on how to reduce utility costs, such as electricity costs. Often, the auditors also supply or sell some or all of the equipment, such as appliances, insulation, HVACs, thermostats, and the like, used to reduce the utility costs. In one embodiment, the owner or operator of the consumer/supplier market system may charge a fee or collect a percentage based on the use of their services or the related sales of goods or demand-side management services.

In addition, advertisements or offers for the services of a utility bill auditor may also be presented to the consumer. Utility bill auditors typically examine a consumer's utility bill and determine if the rates charged and the total bill, including transportation and distribution charges, are accurate. Typically, the utility bill auditor charges a percentage of the overbilling detected by the utility bill auditor. In one embodiment, the owner or operator of the consumer/supplier market system may charge a fee or collect a percentage of the fee collected by the utility bill auditor.

Various embodiments of the present invention will now be described in greater detail with reference to the figures. Throughout the following description, reference will be made to various implementation-specific details, including, for example, coding conventions, document and protocol standards, forms, and scoring or ranking techniques. These details are provided in order to fully set forth a preferred embodiment of the invention, and not to limit the scope of the invention. The scope of the invention is set forth in the appended claims.

FIG. 1 illustrates an exemplary market place system, including Web components for implementing a consumer/supplier market system in accordance with one embodiment of the invention and illustrates typical user components for accessing the system. By way of example, the exemplary consumer/supplier market system may be used with the exemplary methods and Web pages discussed below.

Using a terminal or computer connected to the Internet, consumers access a consumer/supplier market Web site at which they may register, so that suppliers, such as utility providers, may bid to supply the consumer's various product and/or service needs. A neutral intermediary may operate the Web site, thereby earning the trust of both consumers and suppliers. The consumer computers may run commercially-available Web browser applications, such as Microsoft Internet Explorer® or Netscape Navigator®, which implement the basic World Wide Web standards such as HTTP and HTML. In addition, the consumer/supplier market Web site may be connected via the Internet or other network to servers associated with various utility suppliers, their intermediaries, or wholesalers.

The consumer computers may also run commercially available e-mail applications, such as Microsoft Outlook®, Outlook Express® or Netscape Navigator®, which may be used to send and receive communications, such as bids, bid acceptances, account information, and profile information, from or to the consumer/supplier market Web site or utility suppliers or their intermediaries.

In the embodiment described herein, the consumer/supplier market Web site includes a computer system and associated content that are accessible via the Internet. The Web site may optionally include content that spans multiple Internet domains, and/or may be implemented using physical servers that are geographically remote from one another. In other embodiments, the Web site may be in the form of an Intranet site, and the consumer computers may be coupled to the site by a private network.

In other embodiments, the consumer/supplier market Web site may be replaced with another type of network site. For example, the various services described herein could alternatively be implemented on a hypertextual site or browsing area of an online services network such as America Online® or MSN®, or using interactive TV, in which case users may access the site using software that implements non-standard document formats and transfer protocols.

As further depicted by FIG. 1, the consumer/supplier market Web site includes a commercially available Web server application. The Web server application accesses an HTML page code database used to generate Web pages in response to the actions of end users.

The consumer/supplier market Web site also includes a translation application which includes the basic functionality for receiving consumer usage and other profile information from the consumer or from their incumbent supplier and translating that information into a consistent format. The translated consumer information is then stored in a consumer profile and account database, implemented using a commercial database product, such as one from Oracle. The translation application also receives bid information from the suppliers and translates or parses that information into a consistent format. The information is then stored in a supplier database. A scoring application scores and/or codes the consumer's profile information and stores the score and/or code in association with the consumer's profile in the consumer profile database. Similarly, the scoring application scores and/or codes the supplier's bid and stores the score and/or code in association with the supplier's bid in the supplier database.

Optionally voice and/or visual interfaces between consumers, suppliers, and/or the consumer/supplier market system may be provided as well. These user-friendly interfaces may be used to facilitate the generation of the consumer profile, the aggregation definition by suppliers, and the offering and acceptance of bids.

Figure 2:
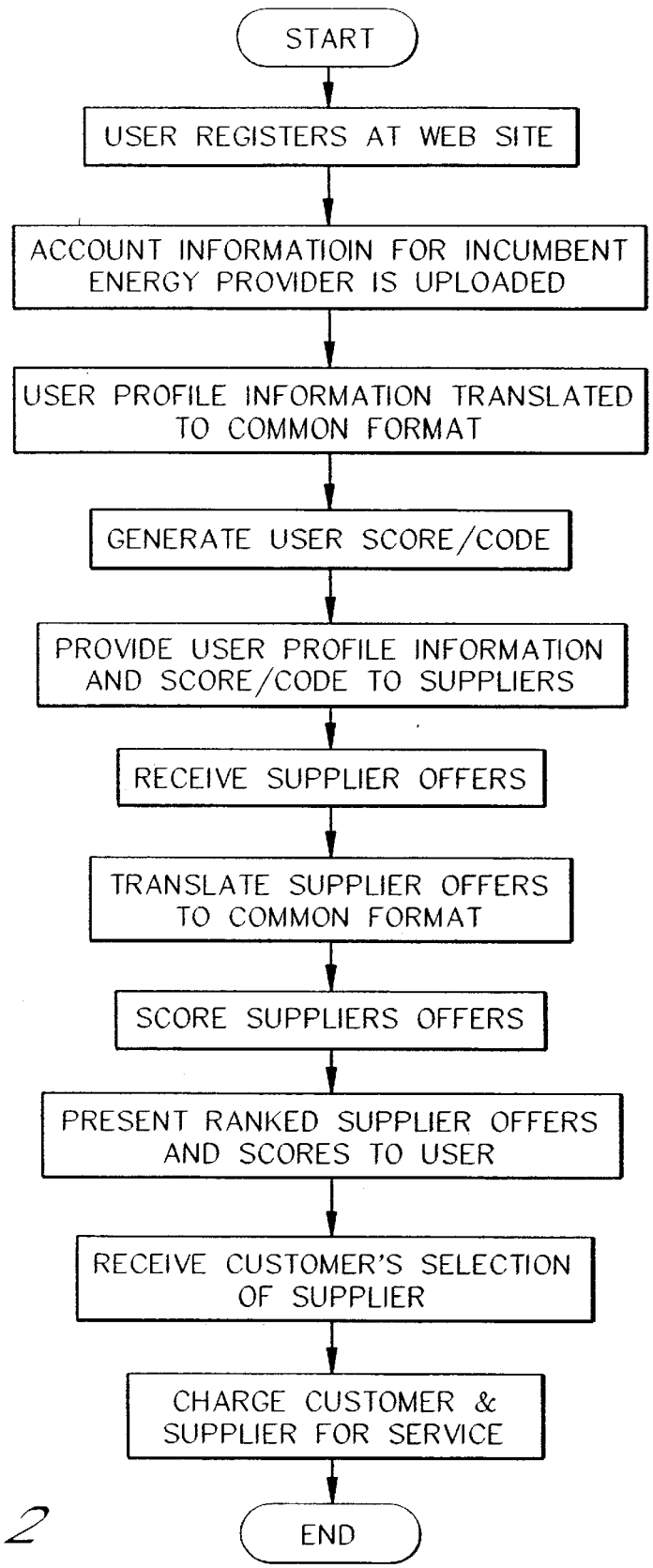
FIG. 2 illustrates an exemplary method performed by the consumer/supplier market system illustrated in FIG. 1.

FIG. 2 illustrates an exemplary process of registering consumers and matching consumers utility needs with suppliers, performed by the consumer/supplier market system illustrated in FIG. 1. First, the consumer registers at the consumer/supplier market Web site. FIGS. 3–6 illustrate several exemplary forms used in one embodiment of the registration process. These exemplary forms are for a consumer looking for bids to supply the consumer's electricity needs. The forms may be stored in the HTML database. As illustrated in FIG. 3, the consumer or user selects a user identifier, a password, indicates whether the registration is for a commercial or residential account, provides an e-mail address and credit card information. If the consumer indicates that a residential account is being opened then additional residential account information forms will be later presented. If, instead, the consumer indicates that a commercial account is being opened then additional commercial account information forms will be later presented.

Figure 4:
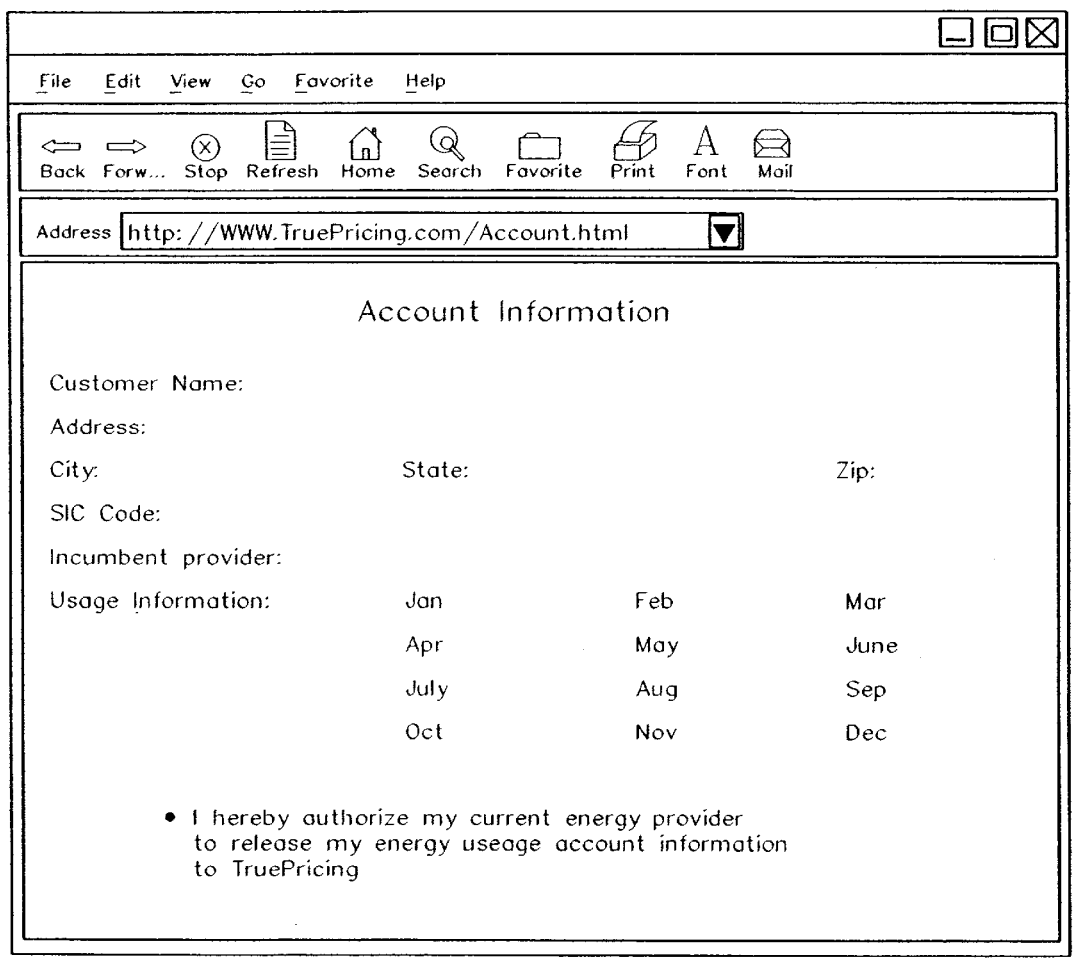
FIG. 4 illustrates an exemplary Web site page account information form.

The consumer is then presented with an account information form, such as that illustrated in FIG. 4, having fields into which the consumer may enter data from previous utility bills. The requested data includes, among other information, the customer name, address, SIC code, name of incumbent provider, and usage information. This information may then be used to build a consumer profile to help suppliers, their intermediaries, or wholesalers bid appropriately to supply services and/or products to the consumer.

In one embodiment, the consumer may be asked to specify the incumbent provider in an earlier form, such as on the form illustrated in FIG. 3. In such an embodiment, the consumer/supplier market system may optionally present an account information form that has the same fields and may look similar to the statements provided by the incumbent provider, easing the data entry task.

Optionally, the consumer may grant permission to the consumer/supplier market system to retrieve some or all of the requested data from the consumer's incumbent supplier. If available, this data may be electronically transferred over a network or using a recording medium, to the consumer/supplier market system. The uploaded data may be used to spare the consumer from manually entering the data and/or may be used to confirm information provided by the consumer.

FIGS. 5A–B illustrate residential account information forms. These forms are presented if the consumer indicated on the form illustrated in FIG. 3 that a residential account is being registered. The data requested on these forms is used to further develop the consumer's profile. The requested information relates to electricity usage patterns, efficiency of use, geographic point of consumption, and desired energy source. Thus, for example, the consumer is requested to provide information on the number of people who are typically are at home during different periods. In addition, the consumer is asked whether the consumer has certain types of energy-using appliances, such air-conditioners, heaters, dishwashers, pools, and the like, as well as the method for powering those appliances. In addition, other information, such as the year, make, and model of the appliances may be requested as well. Further, the consumer may be asked whether the residence is owned or rented, the age of the home, the square footage of the home, the type of insulation used, the type of interior and exterior lighting, the type and number of windows, the type of thermostat and thermostat settings for different times of day during different seasons, and so on.

FIGS. 6A–C illustrate commercial account information forms for commercial facilities. These forms are used to gather information which can be used to build a commercial consumer profile. These forms are presented if the consumer indicated on the form illustrated in FIG. 3 that a commercial account is being registered. If the consumer has previously registered, the consumer may be presented with the forms already filled out with previously received registration information. The consumer may then be asked to update usage information and verify that the other information is still accurate.

As illustrated in FIG. 6A, information related to the type of business conducted at the address, the number of employees, their working hours, and facility shutdown periods is requested. In addition, the consumer may be asked to specify the number of employees at each consumer facility. Furthermore, information relating to energy consuming units, such as the facility's HVAC unit, may also be requested. Additional information relating to the type of lighting (florescent, incandescent, halogen), the building construction technique, whether the facility is rented or leased, the facility size (in square or cubic feet or meters), and so on may be requested as well.

The exemplary meter form illustrated in FIG. 6B is used to request metering information for a first meter, including, by way of example, the location, address, meter type, and rate class. If additional meters are being registered, then the consumer may activate the "more meters" link and a new meter form will be presented. Once information has been provided on all the meters, the consumer may activate the "no more meters" link, and the form illustrated in FIG. 6C is presented.

FIG. 6C requests information related to billing, possible rate discounts, and facility information. In this example, the consumer may elect to have all meters billed together on one bill, twice a month. Alternatively, the consumer may elect to have separate bills for each meter. Further, the consumer may elect to have commodity and non-commodity charges provided on a single bill or on two separate bills. Thus, the consumer is provided great flexibility in specifying how billing is to be performed. In addition, the consumer may provide information as to whether the consumer is part of a larger chain or is part of a trade or other association. This information may be used to determine if the energy supplier has a discount arrangement with the chain or association, so that the consumer may receive discounted rates or other buying preferences. The consumer may also be asked to indicate the square footage of the facility and whether the facility is leased or owned.

Figure 9A:
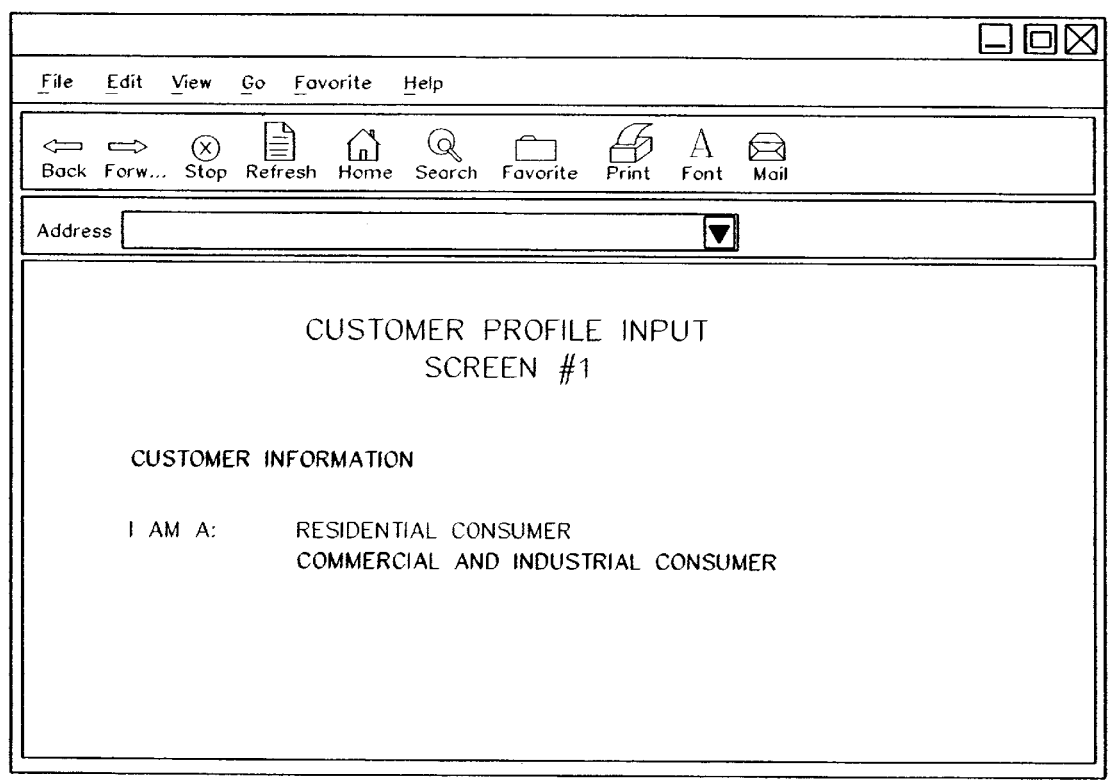

FIGS. 9A–C illustrate another embodiment of a set of registration forms. As illustrated in FIG. 9A, the customer is asked if the account is for a residential or commercial/industrial consumer. As illustrated in FIG. 9B, the consumer is asked for a variety of customer information, including tax identification number, customer name, primary contact name, and one or more primary contact addresses, as well as the type or types of commodity to be priced or bid on.

FIG. 9C requests customer utility and usage information, including by way of example, the service account number, the service account address, the state where the service address is located, and the name of the current provider. Metering information, including the number of meters associated with the service account number, the meter number, rate class, and the meter billing address, may be requested as well. The form also includes usage related fields, including on, off, and mid peak usage times and quantities for different seasons. The customer is also requested to provide information on customer charges, PX energy credits, and revenue cycle services credits. The consumer may elect to be part of an aggregated load cost to receive better bids.

Referring to FIG. 2, once the profile information is received, the information, including information entered into the forms and information uploaded from the incumbent energy supplier, are translated into a common or consistent format to facilitate the manipulation of and searches for the information. Based on the profile information, a consumer score or code is generated as discussed above. The consumer profile information, and/or the scores/codes are provided to one or more suppliers, with certain information, such as contact and related private information, filtered out. The suppliers may be charged a fee for the consumer profile information and an additional fee for the consumer codes. Optionally, the suppliers may specify what consumer characteristics they desire, and consumer profile information, and/or the scores/codes for consumers having those characteristics is supplied.

Figure 8:
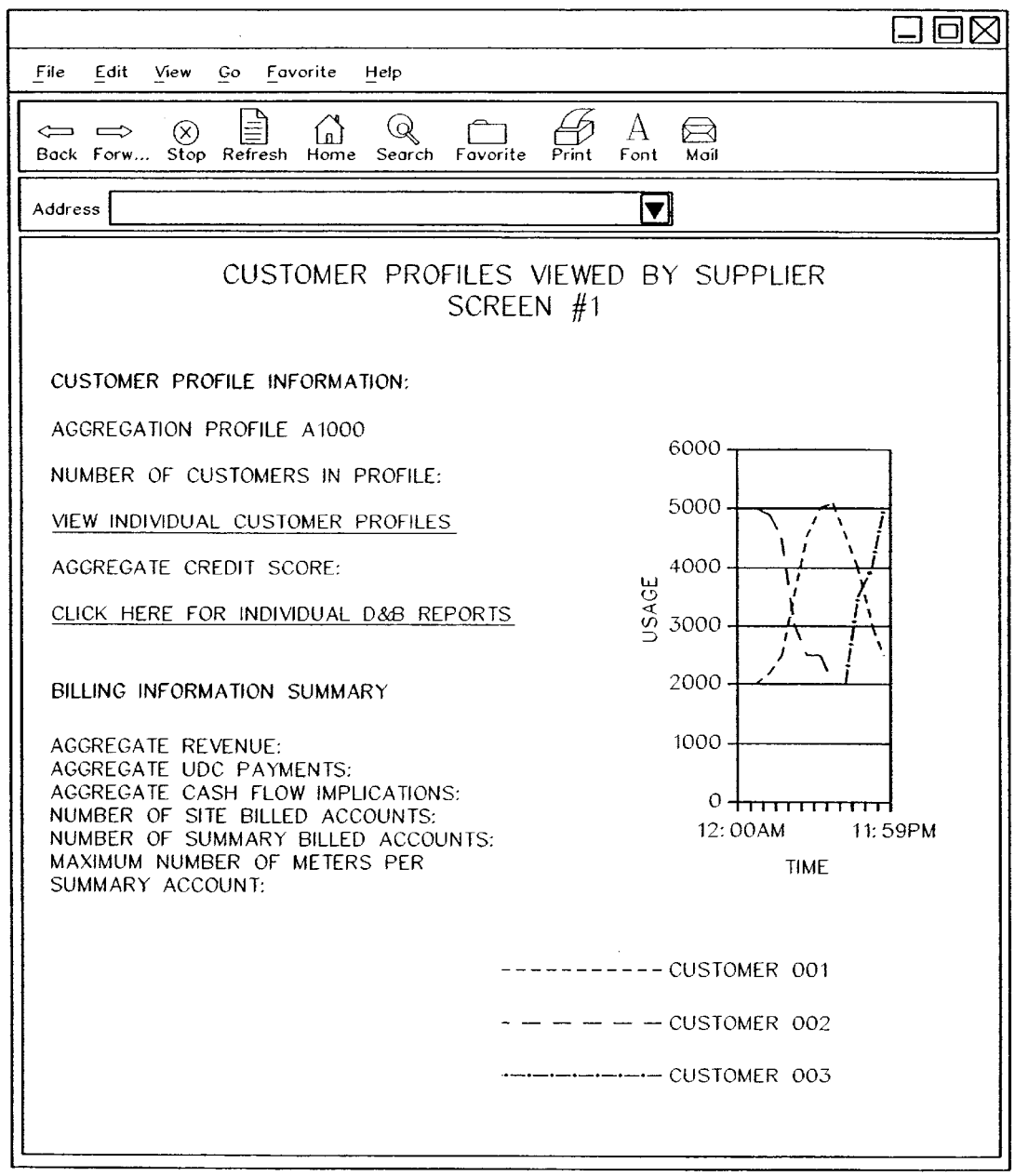
FIG. 8 illustrates exemplary information presented to a supplier.

FIG. 8 illustrates one embodiment of a display including information provided to a supplier. The display provides information on the number of customers in the aggregated profile, the aggregated credit score, aggregated predicted revenue, UDC (Utility Distribution Company) payments, cash flow implications, number of site billed accounts, number of summary billed accounts, and the maximum number of meters per summary account. In addition, graphical information is provided indicated consumers' usage versus time. Individual customer's usage may be charted as well as the aggregated group's usage. This makes it easy for suppliers to quickly evaluate the desirability of the aggregated group and provide an appropriate bid, if any.

The suppliers may then decide which consumers they wish to bid to supply utility services and/or products to, and generate corresponding offers. As discussed above, the consumer/supplier market system then optionally translates the offers to a consistent format, and scores and/or ranks the offers. These scored offers are then presented to the consumer in rank order. The consumer may then accept a supplier's offer. The consumer/supplier market system may then charge the consumer and/or the supplier once the offer is accepted.

FIG. 10 illustrates one embodiment of a supplier offer configuration form. The illustrated form may be used to allow suppliers to customize their offers within certain predetermined constraints. For example, the supplier may optionally only be allowed to include term types or elements from a predetermined set of terms or elements, such as those displayed in FIG. 10. The displayed form includes a "Use Element" column, wherein if a supplier activates the check box for a given row, the associated contract element in the contract element column will be included as part of the contract or proposal to one or more consumers. Some of the contract elements may be mutually exclusive. The element type column specifies the type of element (alpha, numeric, alphanumeric, matrix, ASCII, or other type) to be entered into the element value column. The actual element value is entered into the element value column. The exemplary form illustrated in FIG. 10 includes examples of appropriate element values. The account level column is used to specify whether the contract element is to apply at the account level, such as at the meter level or other low level, or at a higher level, such at the billing, service, or customer level.

To reuse the offer without having to reenter the data, the supplier can save the offer terms as a standard product by entering the product name in the Product Name field. Using the corresponding illustrated fields, the supplier may also enter an abbreviated product name, indicate whether the product is currently active and so may be offered, and the state or states the offer is valid for. Using the Edit Users or Add New User functions, the supplier may specify who is authorized to view, edit, and/or add products. Authorized users may utilize the Edit Product function to edit the terms of an existing product. The Add New Product function may be used to create or define a new product. The Add Product Element function allows additional contract elements to be defined. The Add UDC function is used add another Utility Distribution Company or default provider.

The use of the illustrated form will now be explained in greater detail. By way of example, if the supplier checks the "Auto Renewal" contract element, the offer to the customer will specify that unless the consumer instructs the supplier not to renew the contract within a certain period, such as 30 days, before the end of the contract, the contract will automatically renew for the renewal term entered into the renewal term element value column.

The CA PX Index Price is related to the price the California Power Exchange sets for power in the state of California. The element value is the amount related to the utility commodity that customers will be credited with if they use a provider other than the utility. Competing suppliers will often try to meet or offer a lower price than this credited amount.

ComEd RCDS Customer Class/Demand contract element relates to Commonwealth Edison's Retail Customer Service Delivery customer class or demand category, which is used to determine the new tariff or price a customer would pay if they elected a retail electricity provider.

The Contract End Date and Contract Start Date elements are used respectively to specify the contract start and end dates. Rather than using the Contract End Date element, a provider may elect to use a Contract Term element and enter the corresponding term of the contract.

The Fixed Discount Amount element may be used to specify the discount amount per a given energy unit, such as the number of cents per kilowatt-hour, being offered off the CA PX Index Price. The Fixed Discount Base element is used to specify an additional discount off the CA PX Index Price once the consumer's energy use exceeds an amount specified in a Fixed Discount Base Trigger Amount element (not shown). The Trigger Amount value may be specified as a dollar amount or in kilowatt-hours. The discount may also be specified the percentage discount being offered off the CA PX Index Price using the Fixed Discount Percent element.

Rather than characterize the offer as a discount off the CA PX Index Price or other price, the supplier can specify a fixed energy price per kilowatt over the life of the contract using the Fixed Energy Price (Contract Term) element. Alternatively, rather than specify one fixed price for the entire contract term, using the next two contract elements, the supplier can specify different fixed prices for different periods over the contract term.

The Late Payment Charge element is used to specify the percentage or amount that will be charged for bill payments made after the bill due date. The Net Terms element is used to specify the billing period.

Referring now to FIG. 11, a form or other user interface may be used to edit or add contract elements. A user may enter the element name using the Contract Element Name field. The entered name is the name that will appear in the Contract Element column illustrated in FIG. 10. The user may then select which element value (numeric, alpha, percent, matrix) is to be used with the contract element. The user may also enter a contract element value in the Value field. If the user indicates that this value is to be used as a default value, then the entered value will appear in the Element Value column illustrated in FIG. 11.

The supplier, consumer/supplier market system manager, or other authorized entity may view the defined product or contract types using a report, such as that illustrated in FIG. 12. The report lists the product abbreviation and product name for each product defined by an exemplary supplier. The report may include additional information, such as which products are active, and in what states are they active.

Using a report, such as that illustrated in FIG. 13, the supplier, consumer/supplier market system manager, or other authorized entity may also view a supplier's record of actual proposals, offers, or bids submitted to customers. Under user control, the report may be limited to offers made during a specified period of time, in selected states, to a certain type of consumer (commercial or residential, individual entity or aggregated group), and so on. The report may list an offer identifier or ID, the customer name to whom the offer was made, the date the offer was provided, the date the offer was accepted, and if not accepted, the date the offer expired. If the offer was made to an aggregated group, an aggregated group identifier is provided in the Customer Name field. Activating the group identifier causes a list of group member names to be provided for viewing.

FIG. 14 illustrates one embodiment of a display or report used to list multiple account offers made to a selected consumer. The consumer name, contract type, and status of offer are provided. Each offer may be related to a specific meter associated with the consumer. The report provides the account number, the contract end and start dates, the contract term length, and the offer price or discount. Each account may have its own set of dates, term length, and/or price or discount, providing great flexibility in optimizing offers and in satisfying consumer expectations. Activating the Historical Usage field causes historical usage information for that account to be presented in numerical and/or graphical form.

FIG. 15 illustrates one embodiment of a display report of offers made to a consumer. The report is intended to summarize the offers or bids provided by suppliers, thereby facilitating the task of selecting the most appropriate supplier or offer. The report may be viewed by the consumer, utility consumer/supplier market system manager, or other authorized entity. The report lists the supplier by name or optionally, by an anonymous identifier. By activating certain highlighted fields, such as a Supplier Profile field or a Supplier's Financials field, additional related details about the supplier is provided to the consumer. The consumer may use this additional information in deciding what offer to accept. A Customer Service Ranking may also be provided. This ranking may be based on ratings provided via a survey or the like of the supplier's existing customers. The ranking may also be based on a ranking provided by an independent entity that evaluates objective factors, such the availability of a 24 hour, 7 days a week, customer service line, the ratio of customer service personnel to customers, the number of reported outages or brownouts during a specified period, the number of complaints filed with an appropriate regulatory agency or to the utility consumer/supplier market system manager, and so on.

The report also includes a predicted amount of savings the consumer can expect as compared to the consumer's current supplier. The savings may be specified as a percent and/or as a dollar amount over a given period, such as a year or a month. The savings may be calculated by comparing the consumer's current rates with those offered by the bidding suppliers. In addition, the report provides the contract start and end dates, the contract term, and the type and amount of discount. The discount may be expressed as a percentage, an amount per kilowatt-hour, or in other formats.

A supplier may optionally provide multiple bids to a consumer, each bid having different terms. For example, a supplier may provide a first bid to supply energy at a first rate for a first term, such as 1 year, and a second bid to supply energy at a lower rate for a longer term, such as 18 months. These multiple offers may also be ranked and presented on the report.

Figure 16:
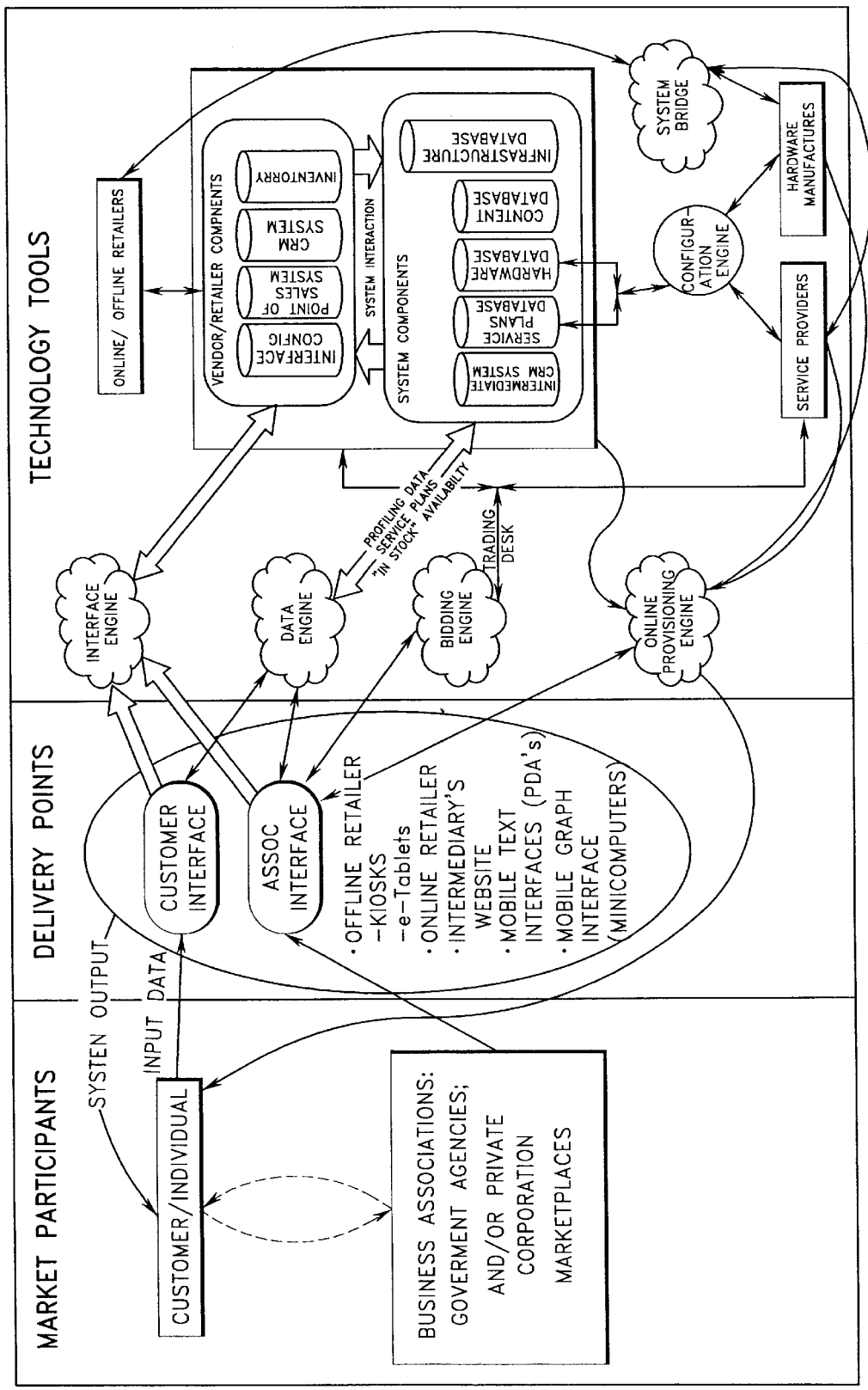
FIG. 16 illustrates a system architecture diagram in accordance with one embodiment of the present invention.

FIG. 16 illustrates an architecture diagram in accordance with one embodiment of the present invention. Advantageously, the illustrated distributed information system provides consumers with substantially real-time information at the point of sale, ensuring that the consumer's requirements or preferences are correlated with the services and/or products being acquired.

As illustrated, the novel process coordinates over one or more networks the following: service providers, equipment providers, brick and mortar retailers and customers. The illustrated process architecture allows the sales of goods and services to be made at a physical, brick and mortar store, or via a web site from the user's home or business.

Using the illustrated architecture, sales of products and services may be made directly to individual consumers, to affinity groups, such as business associations and its members, to government agencies, corporations, and to market places. An affinity group, or the like, may optionally receive payment, credits, or other benefits as a reward for sales made to its members. This encourages affinity groups to refer business to the store, whether online, off-line, as well as to a Website of the system operator. In one embodiment, a basic set of tools is used for physical retail store sales, for sales made by Web sites associated with the physical retail stores, and for sales made via a purely on-line retailer that does not have a physical brick and mortar store.

As similarly discussed above, the system gathers user profile data, including one or more of usage data, feature preferences, lifestyle characteristics and business usage attributes. Once data is captured it is analyzed, based on the analysis and available products and services, the product service bundles that meet the unique needs of the user are presented with optional corresponding rankings. By providing an objective, independent recommendation based on the user's specific profile, confusion and uncertainty on the part of the user is greatly reduced, and retailers, product providers, and service providers can more effectively design and present tailored service offerings.

In the illustrated example, an intermediary manages the vendor-to-retailer-to-customer sales and provisioning process. By way of example, the intermediary is TruePricing, Inc. The intermediary server site hosts a variety of vendor and system components used to manage the process.

Generally, the vendor components provide retailer interfaces allowing management of service and product offerings, account and revenue communication, and tracking with service and equipment providers. This advantageously provides avenues for product widening, upselling, the creation of new provider relationships, data exports and links to internal business systems, and other services based on existing data flow between the retailers and providers.

The vendor components include an interface configuration module, a point-of-sale system (POS) module, a customer relationship management (CRM) module, and an inventory module. These vendor component modules communicate via an interface engine over a network, which may be the Internet, with customer terminals, store terminals, and/or to terminals intended to be used by individual customers or an association's customers.

The interface engine translates data, such as preference, usage or billing data, received from customers into a standardized or common format. The now-standardized data is then arranged into queryable forms allowing comparison and matrixing across different product and service attributes and characteristics.

In addition, the vendor components are coupled via a network to retailers' computer servers. By being able to access retailer inventory and business systems data of service and equipment providers, an integrated data source descriptive of retailer, service and equipment providers is achieved. Thus, multiple attributes relating to products and services, such as geographical locality of services and retail store locations, inventory standings in current and future timeframes, and other related characteristics may be accessed and tracked. For example, the tracking of backorders and purchase orders is provided in an online presence for either the customer or the retailer. This further enhances communication and the interaction between the customer and the retailed.

In particular, the interface configuration module stores and generates retailers' Web site pages in the form of HTML, XML, Java, and the like. When the intermediary site is used to provide services for different retailers, each interface configuration module may be used to store customized Web site pages for each retailer, so that each retailer may have its own look and feel and its own branding.

The point of sale module captures sales-related information for sales being made at the retail store. The sales-related information may include one or more of the product code for the product being sold, the identifier code for any associated service being sold with the product, the price of the product, the up front price (if any) of the service, and customer information, such as customer contact information and credit card number.

The CRM system module is used to establish and maintain relationships with the retailer's customers. The CRM module provides automated marketing, sales and customer care for the retailer's customers. For example, the CRM module may automatically transmit extended warranties or loss insurance offers to customer's who have purchased a product.

The inventory module is used to read retailers' inventory status for a given product and provide the inventory status to a user requesting information or purchasing the product. The inventory module provides inventory management by controlling equipment fulfillment through multiple channels such as from equipment providers, service providers, retail warehouses, retail stores and other equipment sources. Optionally, the retailer can specify that the inventory module indicate that there is no inventory in-stock even should there be such in-stock inventory. In one embodiment, the inventory module provides a notification to the retailer via an electronic message when the inventory for a given product falls to or below a predetermined amount.

The system components include an intermediary CRM module, a service plans database, a hardware database, an infrastructure database, and an intermediary content database. The intermediary CRM module is used to establish and maintain relationships between the intermediary, individual customers and association customers for sales made directly by the intermediary to the customers. The CRM module provides automated marketing, sales and customer care. For example, the CRM module will automatically transmit extended warranties or loss insurance offers to customer's who have purchased a product.

The service plans database stores service plans provided by the service providers. The service providers may be, by way of example, telecommunications service providers, electricity providers, gas providers, ISP providers and the like. In the case of cellular phones, the service plans may specify the number of included prime time minutes provided, the number of weekend minutes provided, and so on. The stored service plans will be selectively provided or presented to customers based on their preferences and usage.

The hardware database stores hardware information and specifications provided by the hardware providers. For example, in the case of cellular phones, the hardware information and specifications may include an image of the phone, the communications standard(s) the phone conforms to, the amount of talk time provided on a battery charge, and so on.

The content database includes other information relevant to the products and services being offered. For example, test reports, consumer reviews, environmental regulations, and the like may be stored in the content database for later retrieval using a query engine.

The infrastructure database includes information on the locations and types of infrastructure maintained by a service provider, and other indicators of service area coverage and the quality of service for each service provider. For example, the location and types of cellular antennas maintained or operated by a cellular service provider can be stored in the infrastructure database. Some or all of this information can be provided to customers to help them select an appropriate service provider, as discussed in greater detail below.

The system components communicate via a data engine to user terminals. The data engine formats the data for presentation on the appropriate terminal. For example, data may be appropriately formatted for use with a physical retail store's terminals and/or sales registers, including, by way of example, sales support computer terminal kiosks, customer self-service computer terminal kiosks, wireless tablet touch sensitive computers, and other networked connected equipment. The data may include data regarding products, service plans, and inventory status of the products. Data from terminals are likewise formatted by the data engine to be compatible with the system components. In addition, when used as part of a pure, online Website, the data engine includes the interfaces and translation tools for processing the data received over the Internet on an intranet from consumers and related associations. For example, the data engine manages manual online input screens, automatic communication services (e.g., XML, EDI), or other data formats. The data engine provides the interface for service and equipment providers to submit offerings to specific single customer or to multiple customers in real-time. The data engine provides bundling capabilities among services, thereby allowing single or multiple service offerings comprised of multiple service provider offerings.

In addition, the service plan and hardware databases are coupled to service providers' sites via a configuration engine. The hardware database is also coupled to hardware manufacture sites either directly or via the configuration engine. The configuration engine translates data received from the service and equipment providers into a standardized searchable format useable with the intermediary site's database tools.

Optionally, an online provisioning engine is coupled to the intermediary site, service providers, and product vendors so that orders can be fulfilled without the participation of a physical retail store.

A bidding engine optionally couples one or more service providers, hardware or product providers, the intermediary site, and consumers. As similarly described above, the bidding engine allows product and service providers to bid to supply corresponding products and services to consumers. The consumers may be aggregated by the providers as described above, or may be pre-grouped. The pre-grouping may be, by way of example, in the form of professional or business associations.

Figure 18:
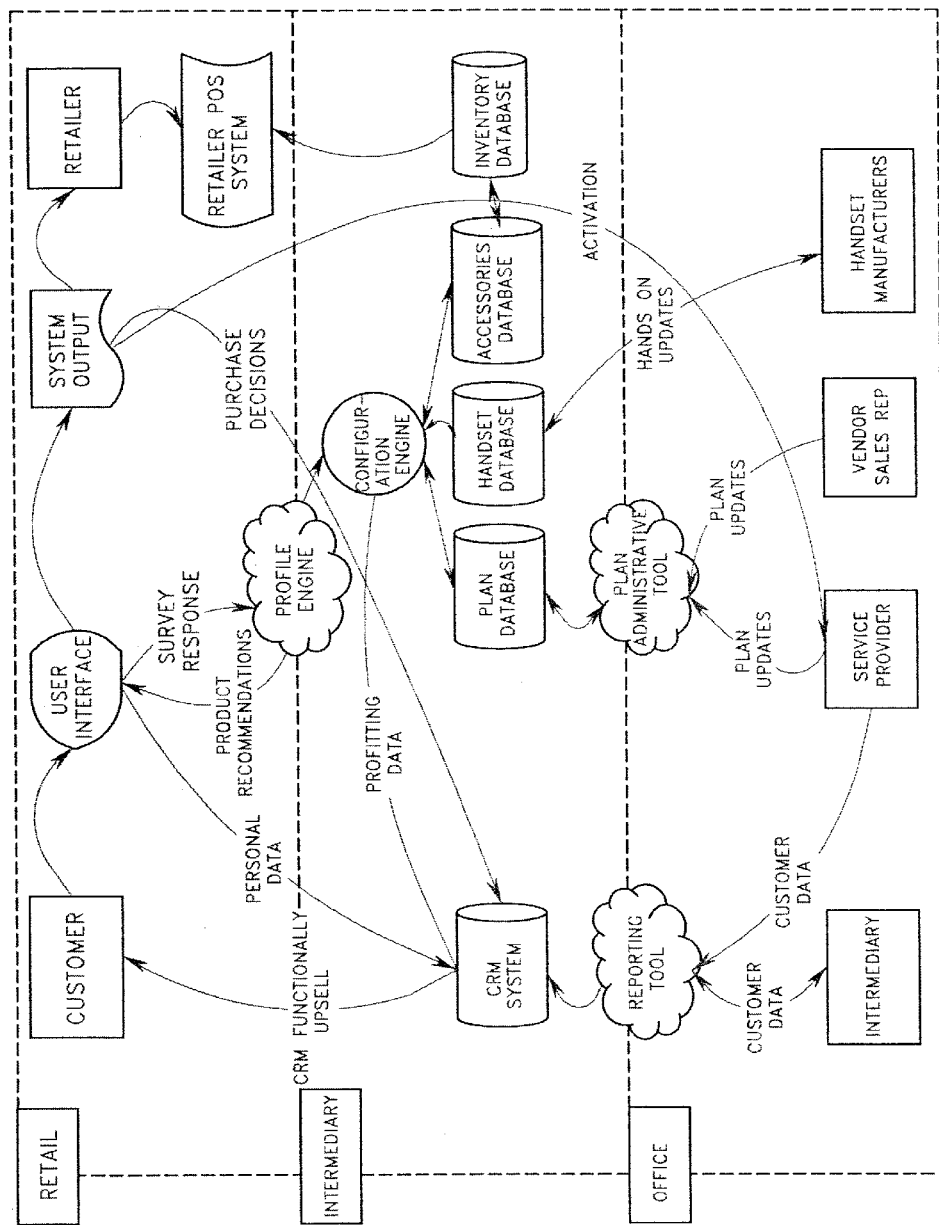
FIG. 18 illustrates an alternative system architecture diagram in accordance with one embodiment of the present invention.

FIG. 18 illustrates an alternative system architecture diagram in accordance with one embodiment of the present invention. FIG. 18 illustrates the relationship between the participants in the transactions discussed above, including the retailer, the intermediary that manages the vendor-to-retailer-to-customer sales and provisioning process, and the vendors,. including the service and product suppliers. At the retailer, the customer provides customer data, such as customer survey responses, via a user interface. The customer orders or selects desired goods and services, such as phones, phone service plans, and accessories, via the user interface. This information is provided as system output to the retailer and the retailer's point-of-sale (POS) system.

Information is communicated between the intermediary and the retail site as follows. The customer data entered using the user interface is sent via an interface or profiling engine to the configuration engine. The interface engine translates data, such as preference, usage or billing data, received from customers into a standardized or common format. The now-standardized data is then arranged into queryable forms allowing comparison and matrixing across different product and service attributes and characteristics. The configuration engine utilizes the queries to retrieve vendor data, such as product and service data. The configuration engine translates data received from the service and product providers into a standardized searchable format useable with the intermediary site's database tools. The data is transferred to a CRM system in the form of customer profiling data. In the illustrated example, the configuration engine accesses a service plan database, a handset or product database, and an accessories data, which in turn communicate with an inventory database. The inventory database communicates with the retailer point-of-sale (POS) system described above. The profile data is also communicated to the CRM system. In addition, customer order information, such as purchase decision information, is provided via the system output. The CRM system provides upsell information and the like to the customer directly, using mail or email, or via the user interface. The communications between the retailer and intermediary can be preformed in real time. A service plan administrative tool using information from service providers or vendor sales representatives periodically updates the service plan database. The handset database is likewise updated using information from handset manufacturers. Customer data is stored in a customer database associated with the intermediary and well as in the database associated with the service provider that the customer has selected to purchase services from. These activities can occur offline, in batch mode.

As previously discussed, a novel process in accordance with the present invention coordinates over one or more networks service providers, equipment providers, brick and mortar retailers and customers. Further, users can correlate the service infrastructures of several different providers with user utilization needs. For example, as will be described in further detail, based on user specified routes, telecommunications infrastructure placement or coverage will be provided to the user. The user can then use the placement or coverage information as a factor in selecting an appropriate service provider.

In one embodiment, a quality of service software application helps users select the service provider that offers the most suitable service. Thus, the quality of service software application advantageously enables customer's to make an informed decision before entering into a service agreement. This contrasts with conventional systems, where customers have little information regarding a service provider's quality of service before contracting with the provider. Hence, customers often simply contracts for the service and hopes for the best. Only after the customer contracts for and utilizes the service, does the customer find out whether the quality of service is adequate or not.

One quality of service (QOS) application in accordance with the present invention aids users select the telecommunications service provider with the most suitable telecommunications infrastructure, including the most suitable placement and density of antennas for the users needs. The customer is asked by the QOS application, via a web page form, to select which service/product combination the customer is interested in. For example, the customer may be asked between cellular phone and pager products and services. If the customer selects cellular phone product and services, the customer is presented with a service area usage form, wherein the customer specifies where the customer intends to use the phone. The user input can be received via a touch screen interface, touch pad interface, voice recognition interface, mouse, trackball, or other user input device.

Figure 20:
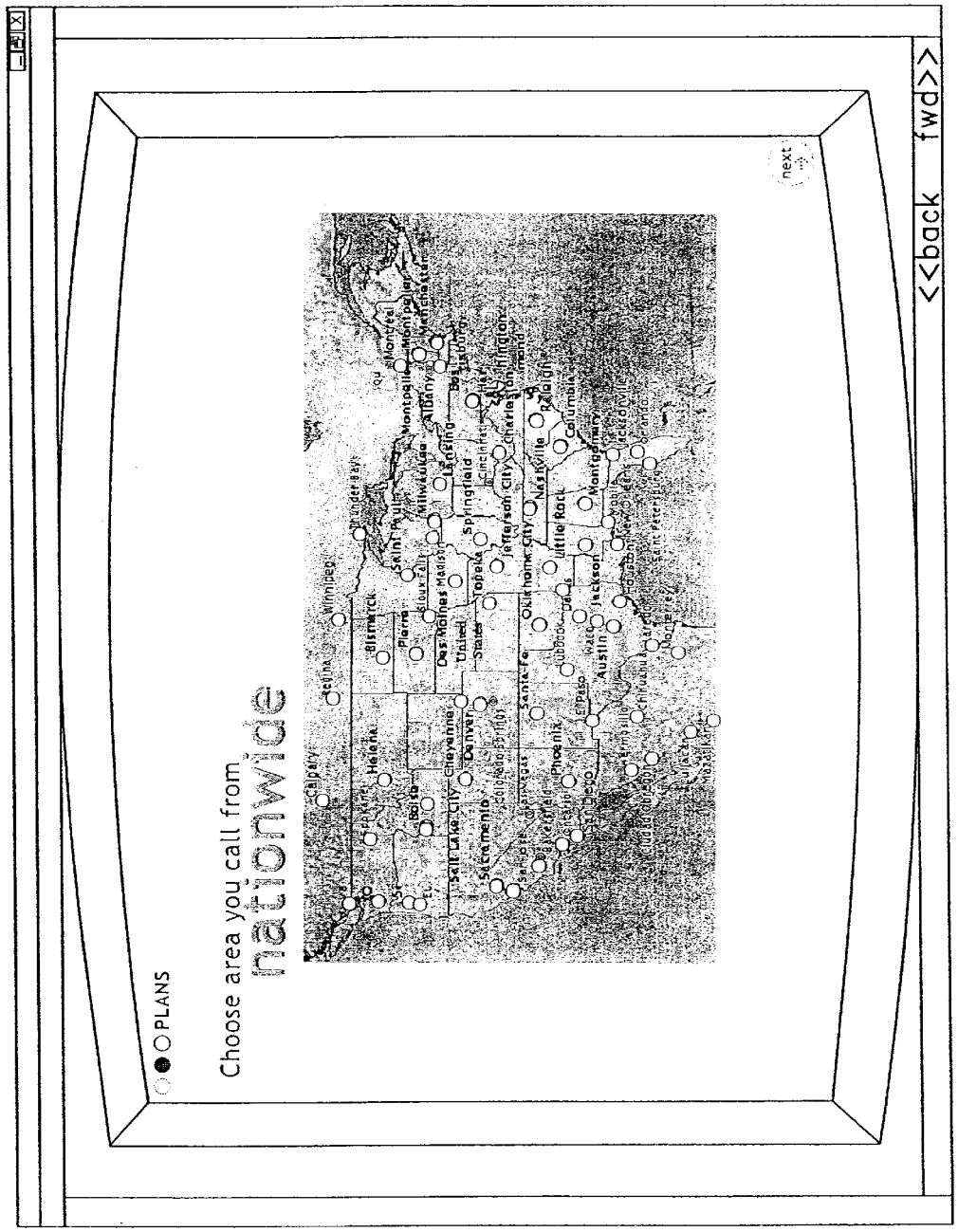
FIG. 20 illustrates an example service area usage form.

FIG. 20 illustrates an example service area usage form. The form may be displayed on a touch sensitive terminal installed in a retail site or on a conventional end-user terminal in the user's home or business. The illustrated form includes a map, in this example, a map of the continental United States and portions of Canada and Mexico. Major cellular service areas are indicated using a circle or the like. Optionally, the name of the city or town located within the service area may be displayed in conjunction with the service area indicator. The user is asked to select which service areas the customer intends to typically use their cellular phone in. The user can select the areas by touching the appropriate circled areas, or can use a pointing device, such as a trackball, touch pad, or mouse, to select the appropriate circled areas. The selected circles are highlighted, filed in, or otherwise emphasized. The user can then submit the selection by activating the "next" on-screen button.

Figure 21:
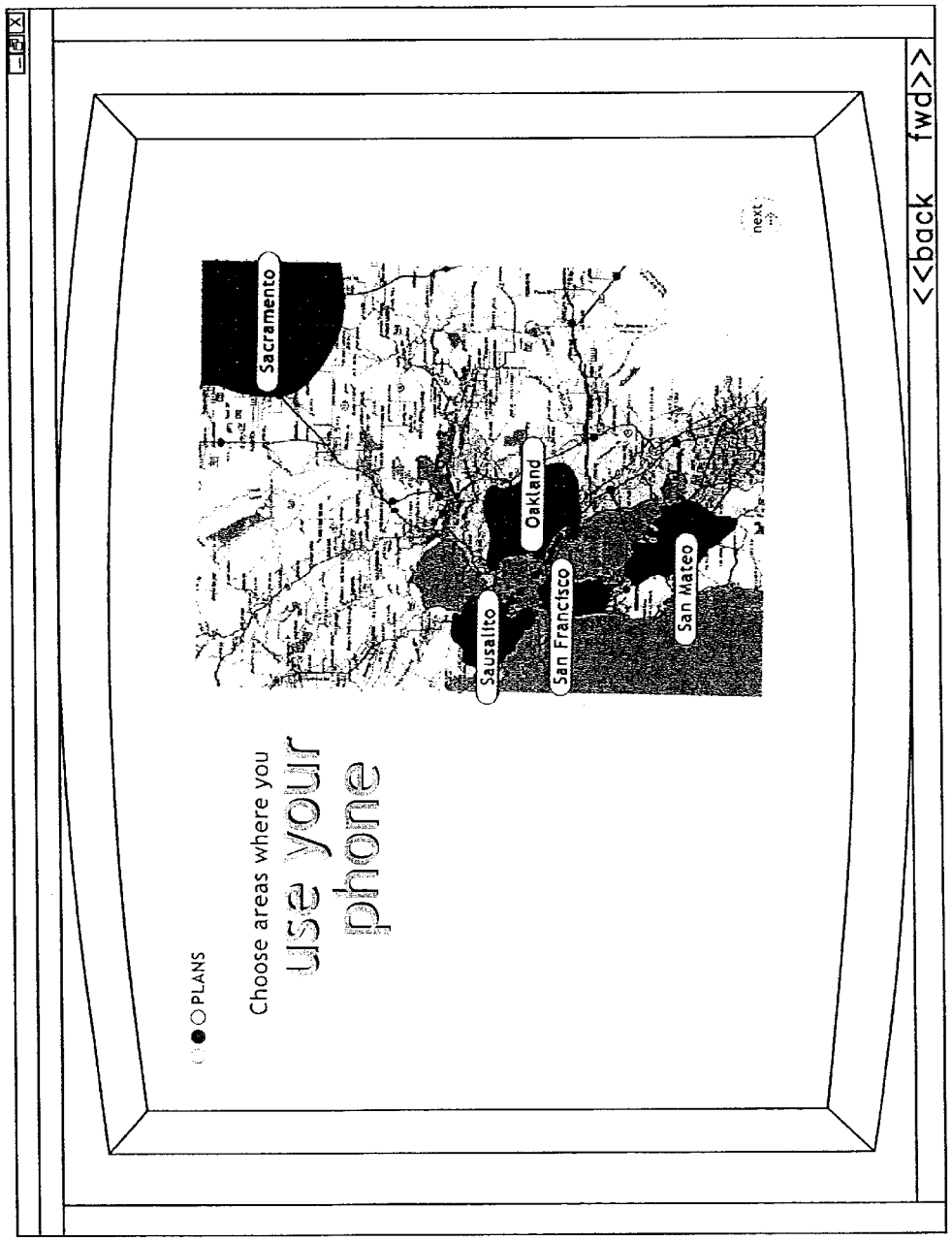
FIG. 21 illustrates an example local service area usage form.

Next, a more detailed map of a first of the selected circles areas, as well as adjacent areas, is presented. The map may show, for example, the local cities and towns within or adjacent to the selected circled area. FIG. 21 illustrates an example local service area usage form displaying a selected service area from FIG. 20 in greater detail. With finer granularity, the user can select in which of these local areas the user intends to use the cellular phone in. For example, the user can select 3 of 5 cities presented. The selected areas are highlighted, filed in, or otherwise emphasized. The user can then submit the selection by activating the "next" on-screen button.

Figure 22:
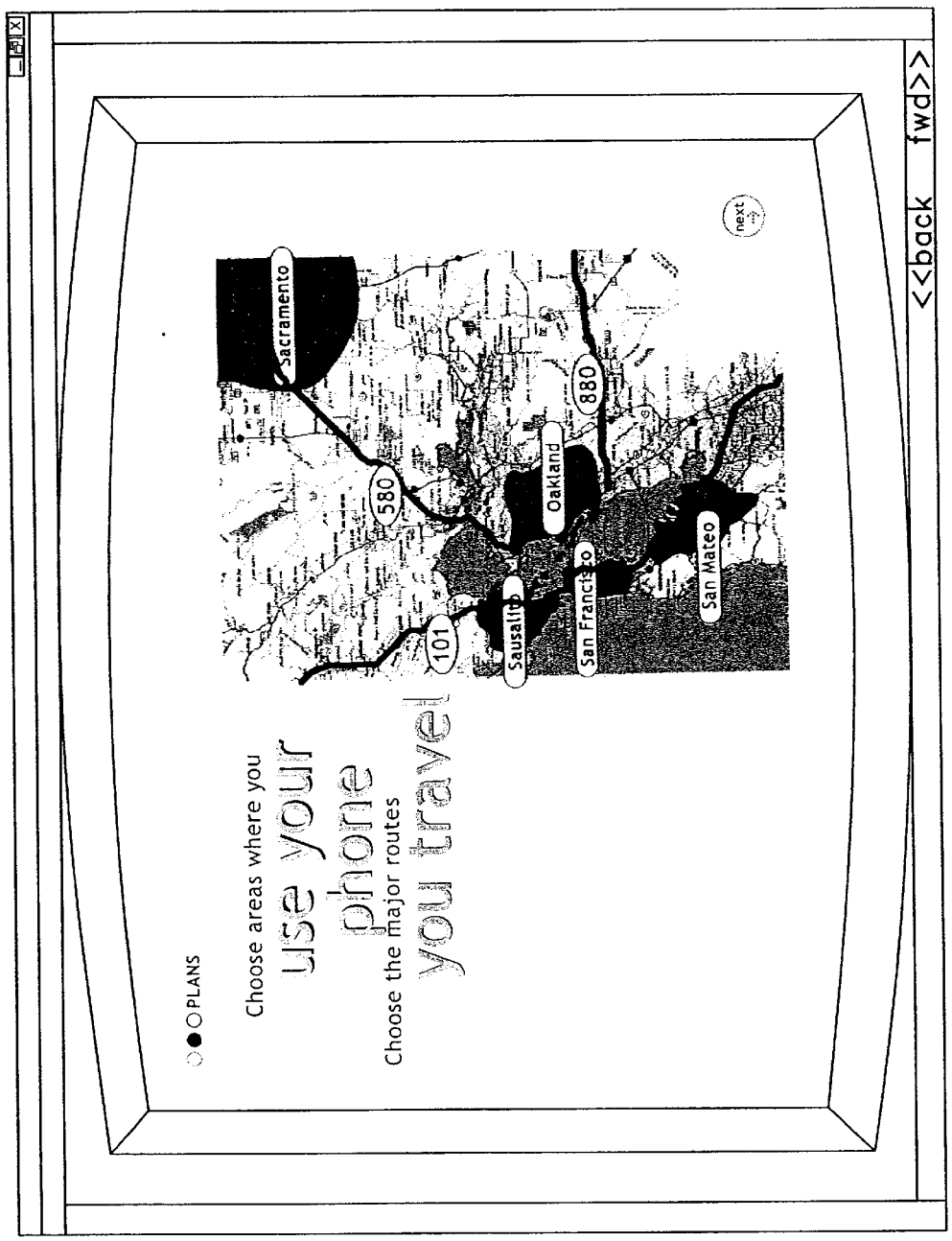
FIG. 22 illustrates an example a service route usage form.

Once the user selects the local areas of interest, the user can indicate which routes the user typically travels on. FIG. 22 illustrates an example a service route usage form. The example form displays and highlights routes connecting the areas selected by the user using the form illustrated in FIG. 21 or leading in or out of the selected areas. The displayed routes can include major and secondary highways, as well as streets, subways, trains, ferries, and other routes. In addition, routes within the selected cities or towns can be displayed as well. The user can then select or indicate which routes the user typically travels. The selected routes are then further highlighted or otherwise emphasized by changing the color of the selected routes, flashing the routes, outlining the routes in bold, or using other emphasis techniques. The user can then submit the selection by activating the "next" on-screen button.

Figure 23:
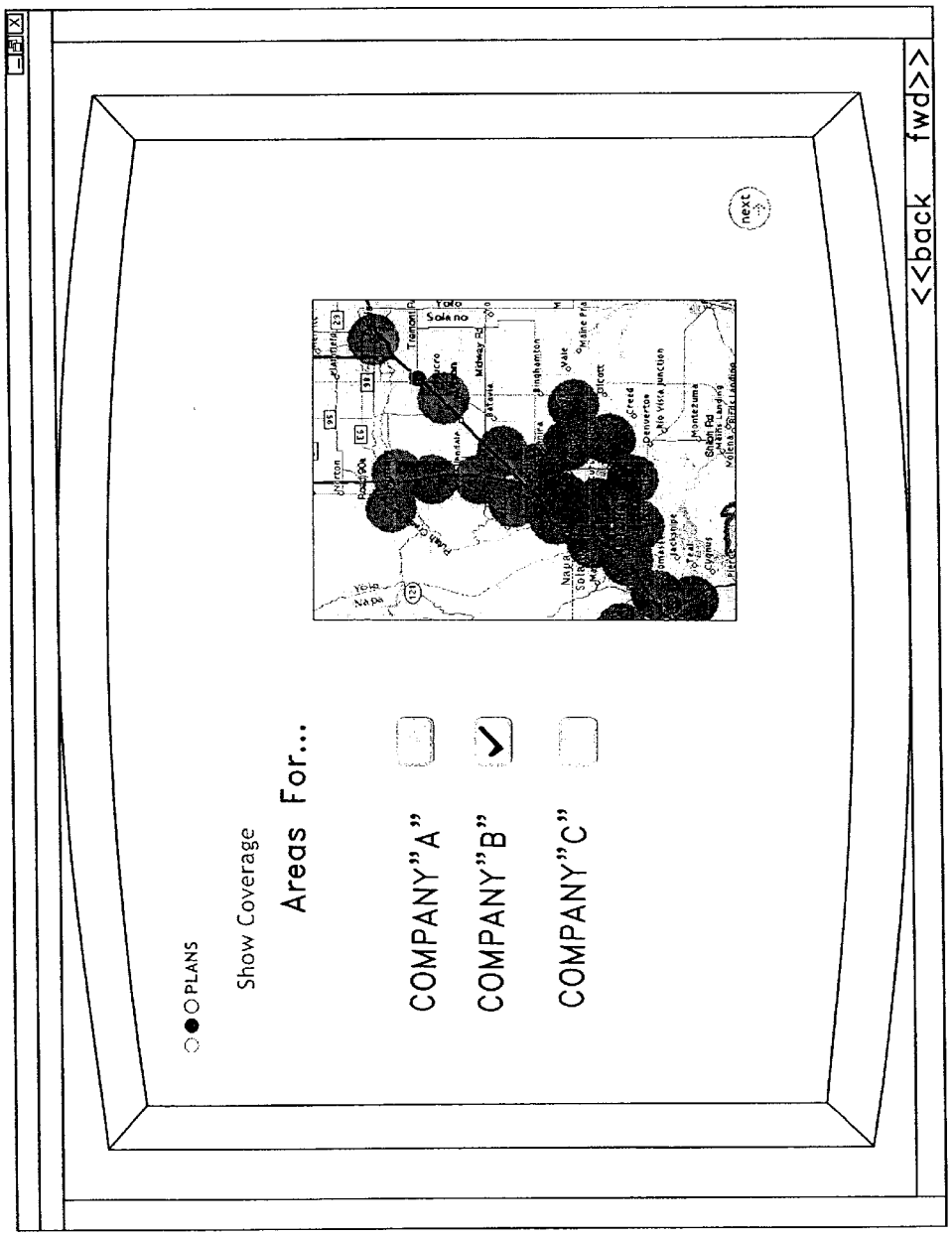
FIG. 23 illustrates an example antenna coverage display for a first service provider.

Next, the user can view the communication infrastructure, in the form of cellular antenna placement and/or coverage, along the selected routes for different service providers. This contrasts with conventional licensed area maps, which do not show actual service coverage, but instead often merely indicate with the provider is licensed to provide service. FIG. 23 illustrates an example antenna coverage display for a first service provider. In this example, the user can select to view the communications infrastructure for Company A, Company B, or Company C. In this example, the user has selected to view the coverage of Company B. The system displays infrastructure indicators, in the form of a circle, for each antenna used by Company B along the routes selected by the user on the service route usage form. The infrastructure information, including location and type information, is stored in the infrastructure database, as previously described. The system can thus display the placement of the service provider's antennas within a bounded area through which the selected route traverses.

If the user's route is very long, such as between San Francisco and Chicago, rather than display the whole route with coverage indicators on one screen display, the coverage map may be divided into multiple screen displays, or in one scrollable map of which only a portion is displayed at one time. This ensures that there is sufficient granularity for the user to visible discern coverage densities and coverage gaps.

By way of example, if the user selects a route traveling between two cities, such as San Francisco and Sacramento, the system determines the latitude and longitude of the city boundary that intersects the selected route. The system then determines a bounded area by subtracting the latitude of the first city, San Francisco, from the latitude of the second city, Sacramento, to determine a first difference value, and taking an absolute value of the result. Similarly, the system subtracts the longitude of the first city, San Francisco, from the longitude of the second city, Sacramento, to determine a second difference value, and taking an absolute value of the result. The bounded area is defined by a rectangle of a predetermined width, such as 80 miles, wherein a first side is approximately centered on a first point where the route intersects the first city and an opposite second side is approximately centered on the second point where the route intersects the second city. Thus, the first and second sides are spaced apart by approximately the predetermined width. The first point and the second point are spaced apart by approximately the square root of the square of the first difference plus the square of the second difference.

The size or diameter of the indicator circle is optionally selected to approximately correspond to the coverage area of the corresponding antenna. Thus, for example, the coverage indicator may vary in size based on the communication technology used. Analog antenna indicators may be, for example, different in size then digital (PCS, CDMA) antenna indicators. Alternatively, the size of the indicator circle may be the same regardless of variation in antenna coverage. Of course, rather than using an indicator circle, other coverage area indicators can be used as well, such as changes in colors or flashing icons. In addition, rather than displaying discrete, if overlapping, coverage indicators for each antenna, an indicator, in the form of a shaded area or the like, can encompass a plurality of antennas' coverage areas. However, this type of indicator is preferably selected so that breaks in coverage will still be evident, that is, the indicator does not encompass areas where there is no antenna coverage.

As illustrated in FIG. 23, there may be gaps in the antenna coverage of the service provider, which can result in service disruption while the user is communicating on the phone. The gaps can be indicated by the absence of antenna coverage indicators, or gaps may be emphasized using icons, flashing symbols, different colors, or the like. In addition, landmarks known to block or interfere with cellular services can also be displayed. For example, geographical features or buildings that can block an antenna's coverage can be indicated. The blocking feature can be indicated on the map, and/or the antenna coverage indicator can be altered to indicate the presence of coverage blockage. For example, rather than a full circle, the coverage indicator my appear as a circle with a triangular slice missing, indicating that coverage is blocked within the triangular area.

Figure 24:
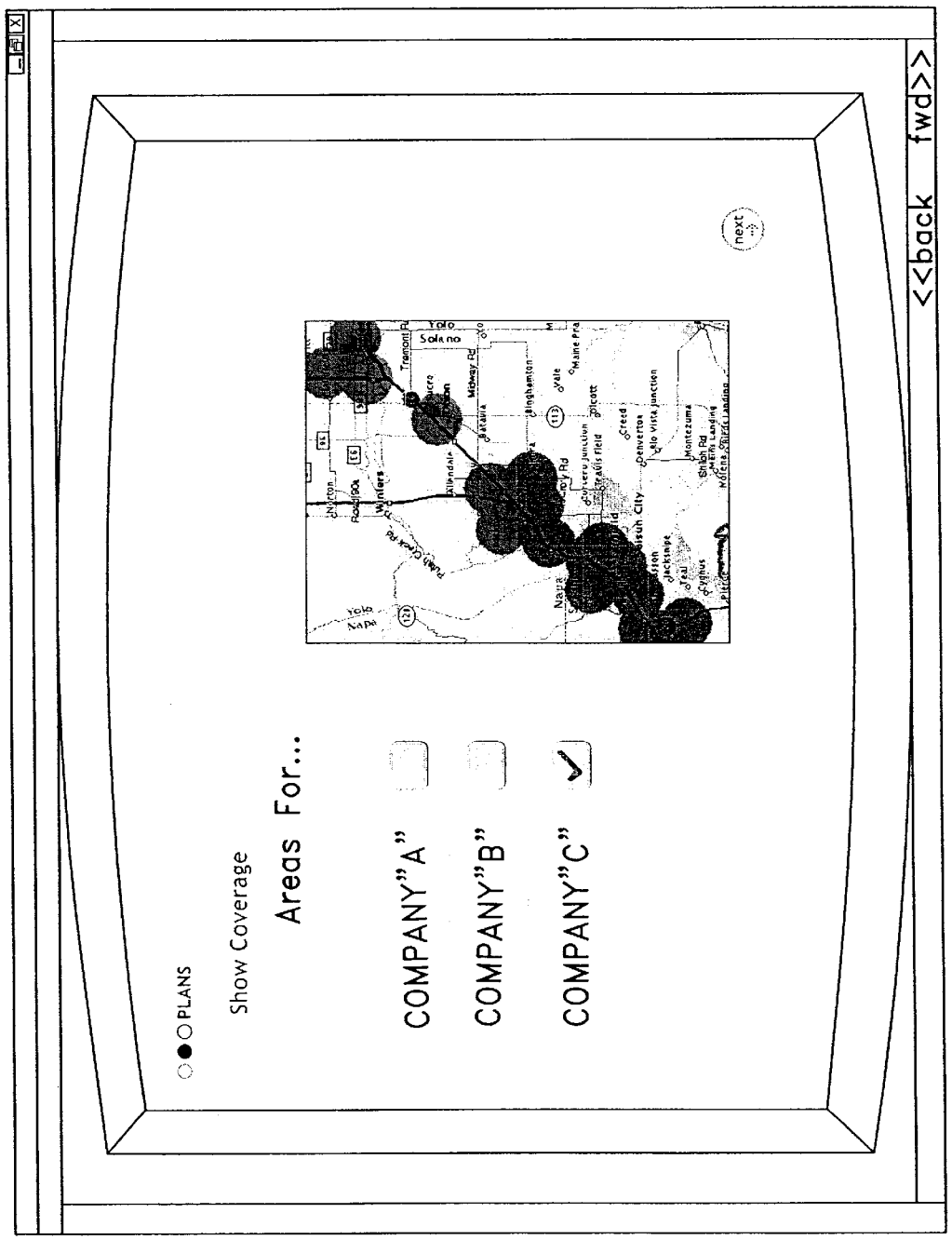
FIG. 24 illustrates an example antenna coverage display for a second service provider.

The user can similarly request to view the antenna coverage of the other service providers, Company A and Company C. FIG. 24 illustrates an example antenna coverage display for Company C. The antenna coverage and antenna density patterns differs from that illustrated by FIG. 23 for Company B. The user can examine the antenna coverage displays for each provider to determine which provider has the most suitable coverage for the user. The user can avoid selecting providers who have service gaps in undesirable locations. In addition, the user can examine the density of antenna coverage in desired areas, and based on the number and locations of gaps and the antenna density of service providers make an informed decision when selecting a service provider. Thus the present invention provides for the correlations of telecommunications antennas or other infrastructure with the user usage.

Figure 25:
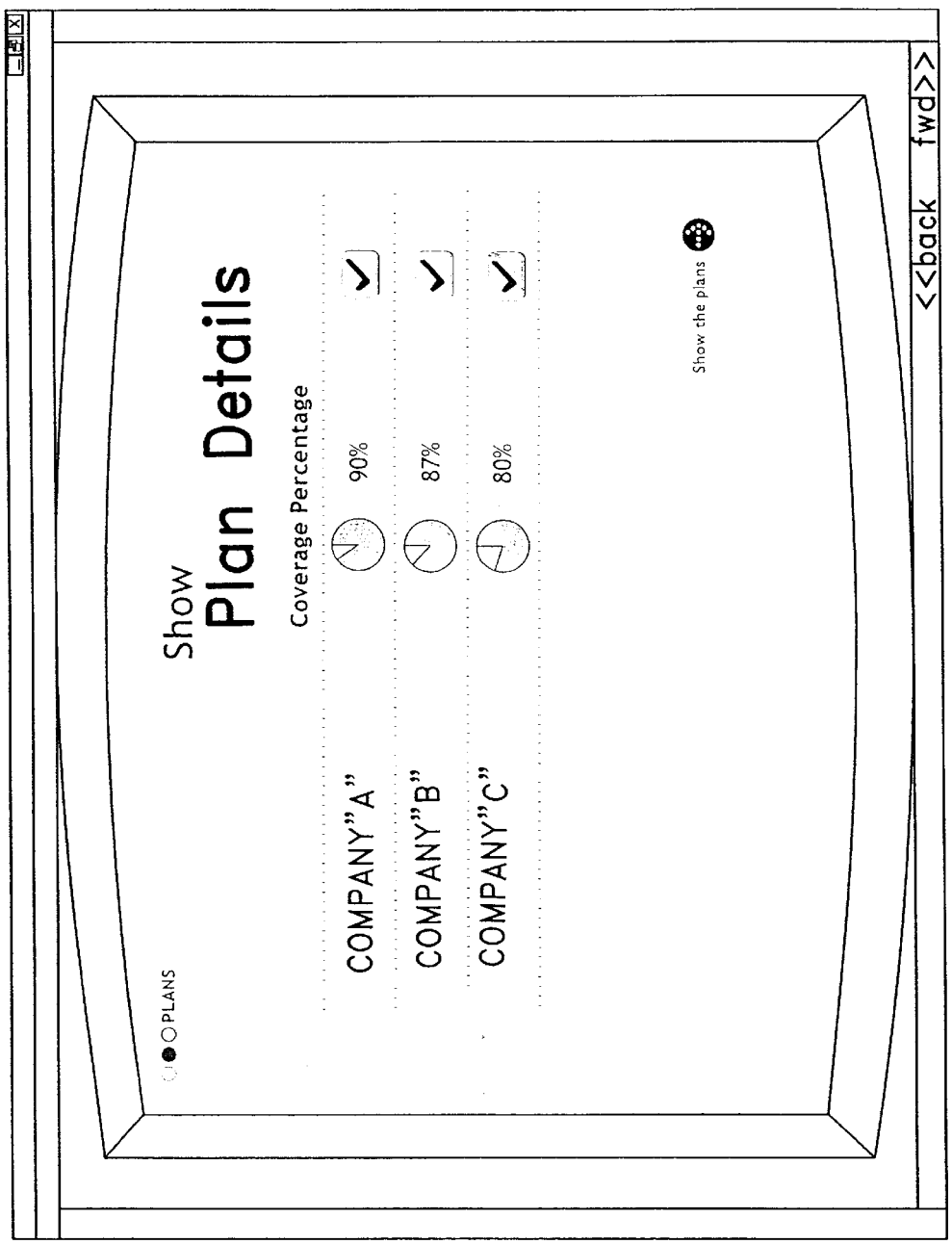
FIG. 25 illustrates an example percentage coverage comparison for a plurality of providers.

To further help the user make a suitable service provider selection, numerical coverage information can be provided as well. The numerical coverage information can include the total square miles or kilometers covered within a bounded area, the percentage of the bounded area that is covered by the provider's antenna, or the percentage of the provider's licensed area that is covered by the antennas. FIG. 25 illustrates an example percentage coverage comparison for a plurality of providers.

The user can optionally down select to a single provider at this point based on the infrastructure coverage, or can still consider one or more providers, while using the coverage information as well as service plan information to make the down selection. The system requests the user to provide anticipated usage information, such as the amount of monthly call minutes that will be used, as well as desired plan features.

Figure 26:
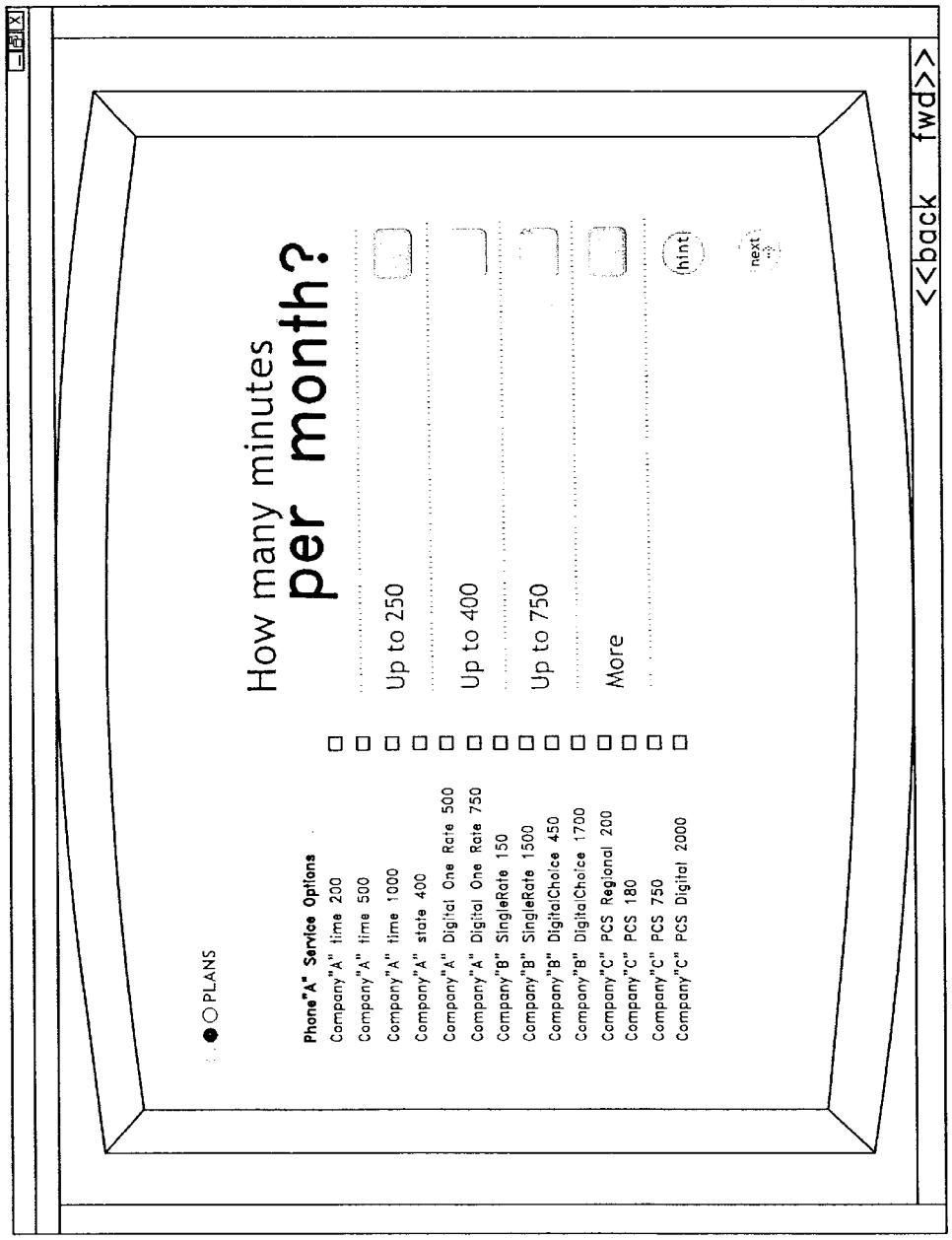
FIG. 26 illustrates an example usage specification form.
Figure 27:
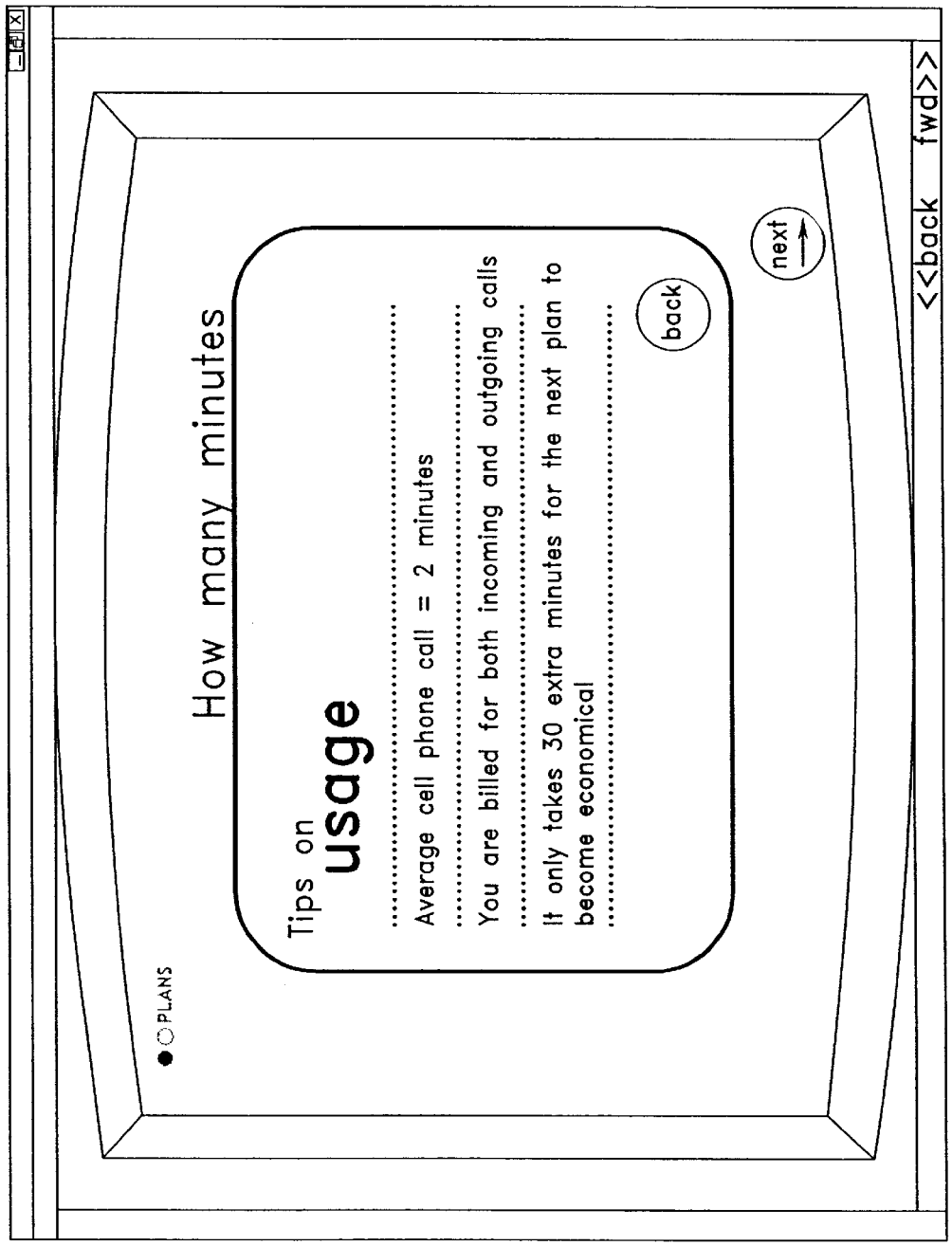
FIG. 27 illustrates an example completed usage specification form.

FIG. 26 illustrates an example usage specification form. The user can select from the following options: up to 250 minutes; up to 400 minutes; up to 750 minutes or more. Before the user makes the selection, available plans are identified, without restricting the display to plans providing a user designated number of minutes. Once the user selects a certain number or range of minutes, the displayed available plans are limited to plans providing that number or the range of minutes. FIG. 27 illustrates an example completed usage specification form, wherein the user selected "up to 750" minutes. The display of available plans on the left-hand side of the form is correspondingly restricted to plans that include up to 750 minutes within the monthly service fee. The user can also be asked if the user wants nationwide coverage included in the monthly fee, or specified local area coverage, or coverage for the areas selected by the user, such as the areas selected using the previously discussed forms.

Figure 28:
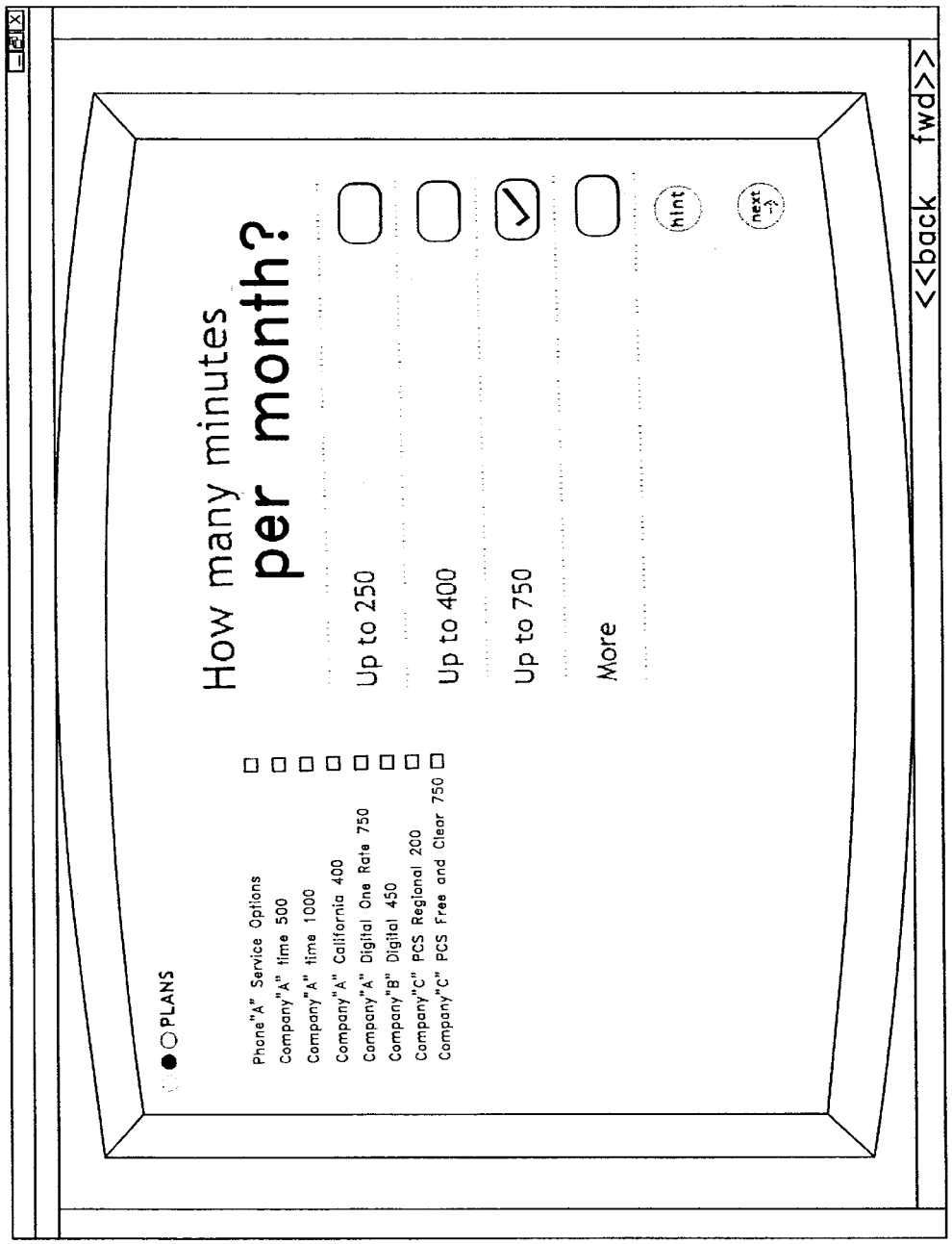
FIG. 28 illustrates an example context sensitive help form.

The user can request help or hints in selecting a service plan by activating a context sensitive hint button or link. FIG. 28 illustrates an example context sensitive help or hint display. The illustrated hint provides the user with information on the average length of a cell phone call, as well on the types of calls the user will be billed for. In addition, the hint provides the user with information on how many additional call minutes beyond the minutes selected by the user using the form illustrated in FIG. 27 it would take to make the selection of the next plan level more economical. In the illustrated example, the hint informs the user that it would take an additional 30 extra call minutes to make it more economical or less expensive for the user to subscribe to the next level plan, which includes more call minutes in the periodic monthly fee.

Figure 29:
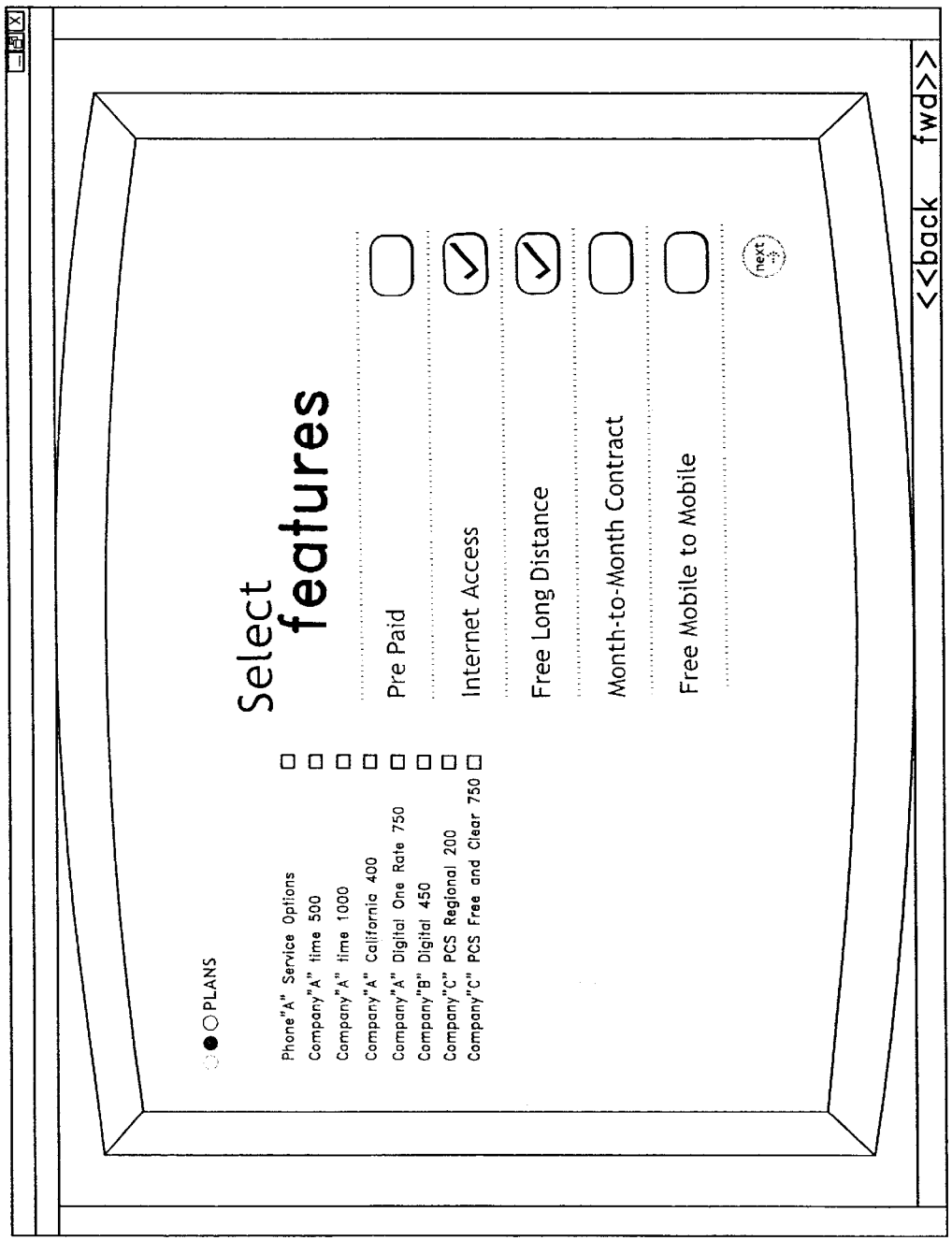
FIG. 29 illustrates an example features specification form.

Next, the system requests the user to select desired service features. FIG. 29 illustrates an example features specification form used to select the desired features. For example, the user can request plans having a pre-paid option for cell phone use, plans including cellular phone Internet access, plans providing for free long distance calls included in the monthly fee, plans providing a month-to-month service contract, and/or free cellular phone to cellular phone calls. The display of available plans is correspondingly restricted to plans that include the selected features. The user can then select from the corresponding displayed service plans.

Figure 30:
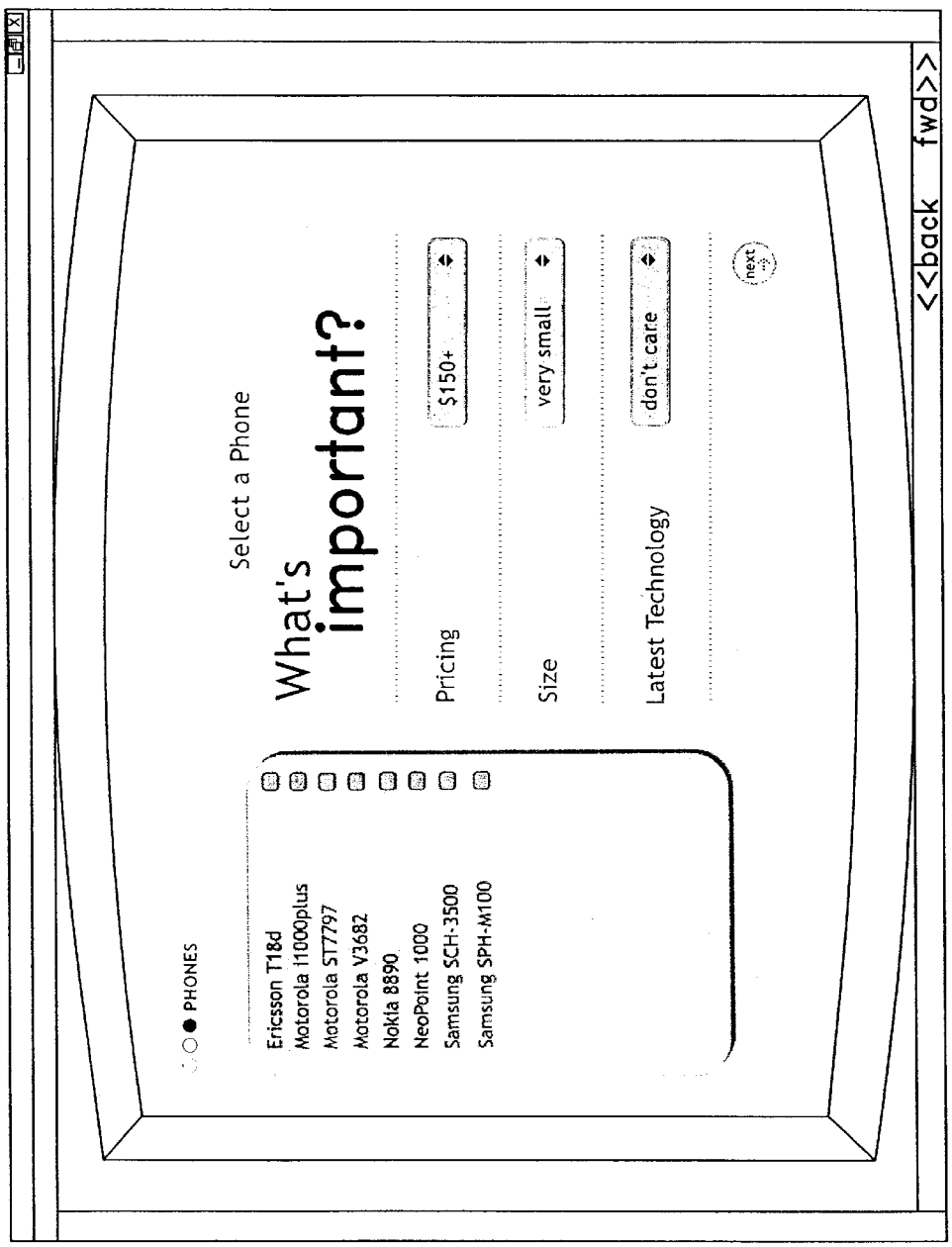
FIGS. 30 and 31 illustrate example phone feature selection forms.
Figure 31:
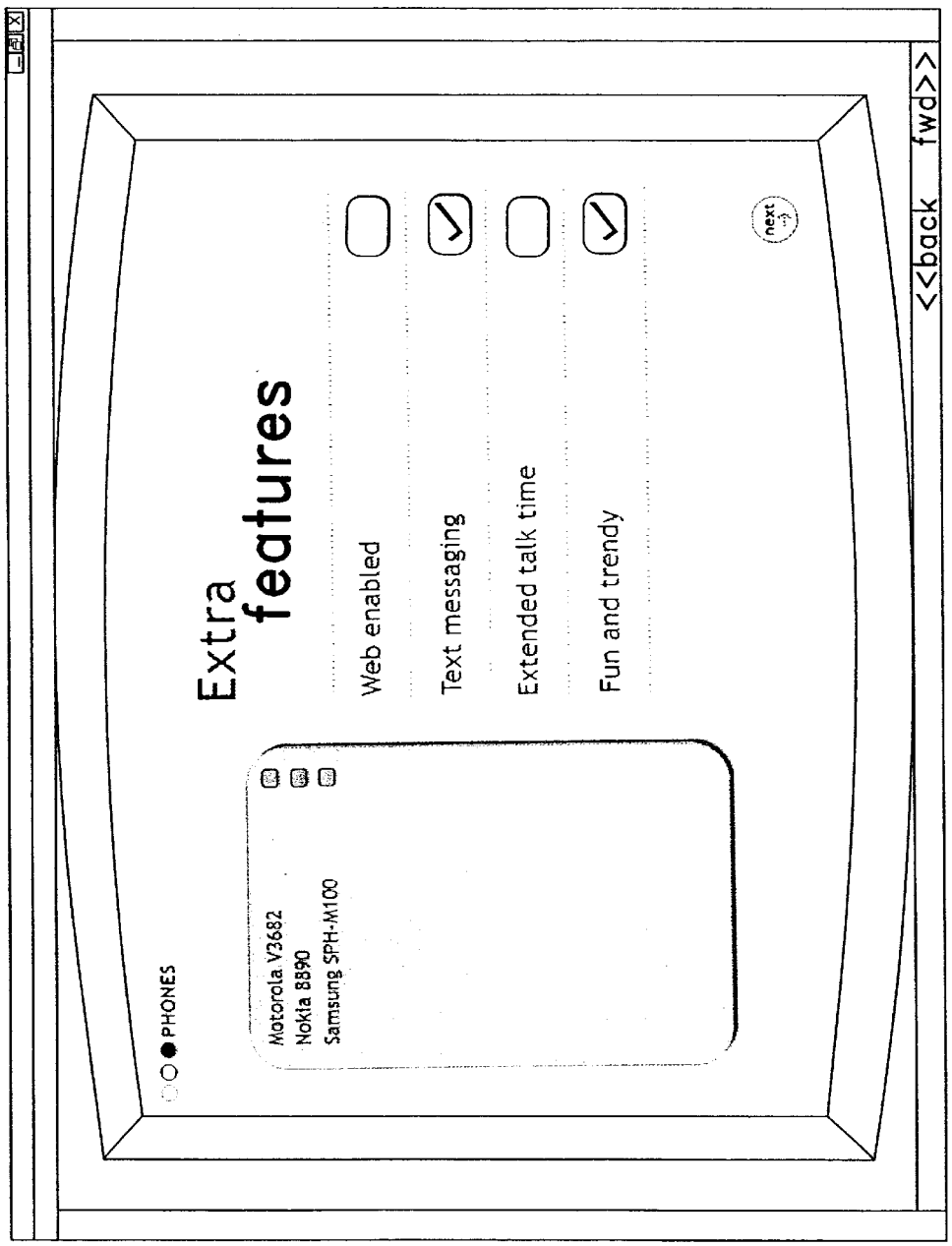

The system then enables the user to select an appropriate cellular phone. The system requests the user to specify the desired cell phone features. For example, the user can specify a desired price range, size, technology, battery life, display type, weight range, web enabled, text messaging, and so on. FIGS. 30 and 31 illustrate example phone feature selection forms. As the user specifies desired features, a list of available phone is provided indicating which phones available phones have the specified features.

In addition, the user is offered a variety of accessories. Optionally, some of the offered accessories are selected by the system based the previous information provided by the user, the service plan selected by the user, and or the phone selected by the user. Thus, for example, if the user selects a nationwide plan, indicating the user probably travels a significant amount, high capacity batteries may be offered. If the user has indicated that the user travels along many highway routes, the user may be offered a hands-free accessory, such as a headset or mounted speaker/microphone combination.

Figure 32:
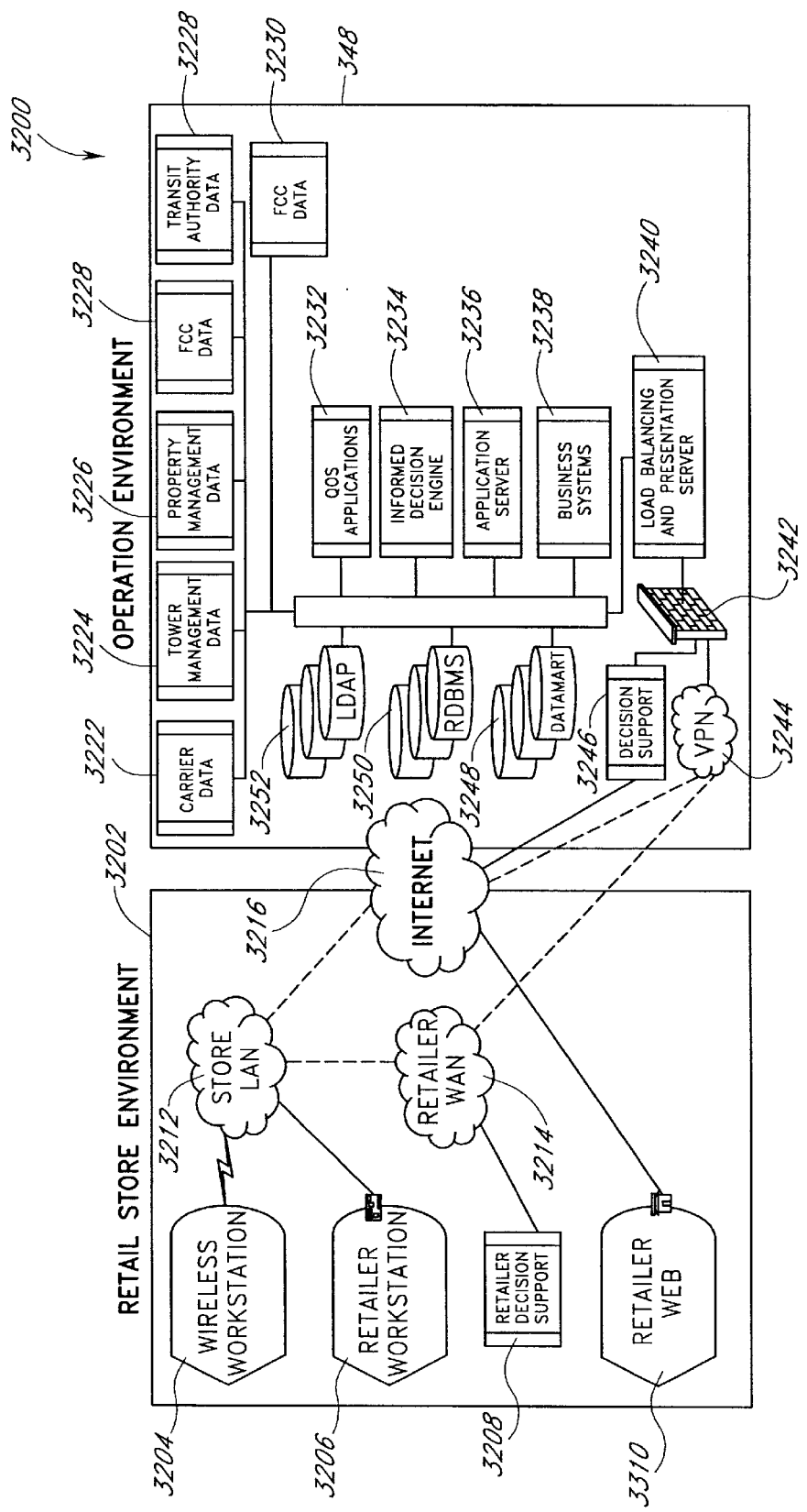
FIG. 32 illustrates an example antenna tracking and usage correlation system architecture diagram in accordance with one embodiment of the present invention.

FIG. 32 illustrates an example antenna tracking and usage correlation system 3200 architecture diagram in accordance with one embodiment of the present invention. A retail store environment 3202 includes an intermediary's workstation or terminal 3204, which can optionally be a wireless terminal with a touch sensitive screen, a retailer workstation or terminal 3206, used to access the retailer's web site, a retailer decision support 3208, a retailer Web site 3210, a store local area network (LAN) 3212, and a retailer wide area network (WAN) 3214. The terminal 3204 and the terminal 3206 can optionally provide user access to both the retailer's Web site and to the Web site and services of the intermediary. For example, the terminals 3204, 3206 can be used to provide a user interface, to thereby display the previously discussed forms and input user information. The intermediary work station 3204 and the retailer workstation 3206 are connected to the store LAN 3212, which is in turn connected to the retailer WAN 3214. The retailer Web site 3210, store LAN 3212 and the retailer WAN 3214 are connected to the correlation system 3200, which may be operated as part of the intermediary environment 3218, over the Internet 3216. In addition, the WAN 3214 can be connected to other stores and/or offsite computer resources of the retailer.

The correlation system operator or intermediary environment 3218 includes an HTML web server 3246 and virtual private network (VPN) 3244, which provide Internet connectivity. In addition, the HTML web server 3246 serves web pages used to provide the service and product information described above. The HTML web server 3246 and the VPN 3244 are connected through a firewall 3242 to the backend of the system 3218. The firewall 3242 provides security and limits access to the backend. The firewall 3242 is connected to a load balancing and presentation server 3240, which is in-turn connected to a local area network interconnecting the backend.

The backend includes quality of service applications 3232, an informed decision engine 3234, an application server 3236, and business systems 3238 configured to access corresponding databases 3252, 3250, 3248 for the storage and retrieval of data. The quality of service applications include applications that enable the user to select service providers that offer the most satisfactory or best quality service based on a given user's needs. One such quality of service application is the telecommunications infrastructure quality of service application previously described. The informed decision engine 3234 aids in finding suitable product choices for the customer. For example, as similarly described above with respect to cell phone selection, the informed decision engine 3234 generates user questions regarding features the user desires for a given product type, and based on the user's responses, provides the user with information on products that meet the user's requirements or desires. The application server 3236 interfaces web browser-based thin clients, such as the workstations 3204, 3206, with backend databases and business applications. The business systems 3238 include, by way of example, marketing software, information technology development software, and back office functions.

The quality of service application 3232 accesses relevant information or data from one or more corresponding databases. The databases may be included in the operator environment 3218, or they may be located off-site, at the source of the data. The databases may be updated in real-time, as new data is made available from other sources, or may be updated on a periodic or batch basis.

By way of example, for the previously discussed telecommunications quality of service application, the corresponding infrastructure data accessed includes carrier data 3222, tower management data 3224, property management data 3226, regulatory agency data, such as Federal Communications Commission (FCC) data 3228, transit authority data 3228, and GIS (geographic information system) data 3230. Separate mapping data, used to present the maps and travel routes, is optionally also included. In addition, landmark information related to landmarks, such as buildings or mountains, that can block or interfere with cellular communication, is also stored. In particular, to develop a more accurate mapping of antenna placement, data may need to be collected from a variety of sources, such as from the service providers, companies that maintain antenna towers for service providers, property owners or managers regarding antennas located on the properties under their control, the FCC, and transit authorities, who have information on antennas located in tunnels, on bridges, along train routes, and the like.

In addition the example environment 3218 includes a lightweight directory access protocol (LDAP) database 3252 that stores and retrieves data, including hierarchical data, for accessing information directories. A relational database management system (RDBMS) 3250 stores product and service plan information. A data mart database 3248 is used to store and access customer profiles and information related to their shopping experiences and habits, including historical purchase information.

FIG. 33 illustrates an example infrastructure database display form, illustrating the associated data available to the system. The system can extract the following stored infrastructure-related information from the database. The database includes cellular market area (CMA) information for some or all CMAs within a predetermined larger area, such as within the United States, Canada, Mexico, and/or other parts of the world. The CMA information can include an area or territory name, a basic trading area identifier, a major trading area identifier, a regional area identifier, an economic area identifier, a major economic area identifier, a regional economic area identifier, an economic area grouping identifier, a VHF public coast station area identifier, and a public safety planning region identifier. This information may, in some circumstances, be obtained from a regulatory agency, such as the FCC. The identities of the licensees for each cellular market area (CMA) of interest are stored as well. The cities, towns, counties, and the like within the CMA are identified, as are their corresponding zip codes and latitude and longitude positions.

A variety of information is stored for each antenna, including the antenna call sign, the name of the local geographic area where the antenna is located, the name of the city, town, or county in which the antenna is located, the name of the state in which the antenna is located, and the latitude and longitude of the antenna location. The source of the information may be identified as well. For example, the source of the antenna location information may be appropriately identified as being sourced by the FCC or by the Cellular Telephone and Internet Association (CTIA). When multiple sources are used to build the database, there may duplicate listings for one or more antennas. In one embodiment, these duplicate listings are identified and only one listing is stored in the database. The identification can be performed by identifying antenna listings or records with the same latitude and longitude information, or having other duplicate information.

In addition, a default, approximate or estimated area coverage for each antenna or for each class of antenna can be stored as well. This information is used to display coverage indicators to users.

This above information is used to correlate the antenna placement with users' usage locations, as previously discussed.

While the above description discusses methods and systems for correlating telecommunication antennas to user routes, the invention is not so limited. For example, the present invention can be utilized to correlate user travel routes to gas station service area coverage for a plurality of gas station operators and to provide the user with station coverage information, the hours the gas stations are operated, whether the gas stations take credit cards, and so on.

Thus, as described above, the present invention facilitates the procurement and management of products and related services and provides an architecture and process that coordinates the sale and purchase of services involving product and service providers, such as stores and vendors, end consumers, such as individuals, companies and associations, and intermediaries. By way of example, the present invention advantageously increases the opportunities for utility suppliers and the like to enter new markets and acquire new customers, while providing customers with the ability to select suppliers who can reduce utility costs and/or offer improved service.

Further, information from the consumer may be collected via a terminal located at a conventional, physical, "bricks and mortar" store. Preference and usage data are collected at the store and based at least in part on the collected data, offers and related information may be generated specifically for the consumer. In addition, the store can optionally provide the product and/or activate the related services to the consumer before the consumer leaves the store.

Although this invention has been described in terms of certain preferred embodiments, other embodiments that are apparent to those of ordinary skill in the art are also within the scope of this invention. For example, while one described embodiment relates to utility services, the present invention is not so limited, and may be utilized with other goods and services, such as those where the price of the products or services are based at least in part on a given customer's characteristics. Accordingly, the scope of the present invention is intended to be defined only by reference to the appended claims.

What is claimed is:

1. A method of correlating telecommunications infrastructure information with user routes, comprising:

receiving from a plurality of sources cellular antenna placement information, including latitude and longitude information, for a plurality of cellular antennas in a plurality of regions;

requesting, over a network, a user to identify at least a first city and a second city in which the user intends to utilize cellular service;

receiving over the network the user city identifications;

requesting the user to identify at least a first route on which the user intends to travel from the first city to the second city;

receiving an instruction from the user to provide coverage information for a first cellular service provider;

identifying, using the antenna placement information, antennas located within a first area through which the first route passes, wherein the antennas are associated with the first cellular service provider;

retrieving information related to the coverage of the identified antennas associated with the first cellular service provider;

displaying, on a map of the first area presented on a first terminal, area coverage indicators corresponding to the identified antennas associated with the first cellular service provider, wherein coverage gaps on the first route can be identified by the user;

receiving an instruction from the user to provide coverage information for a second cellular service provider;

identifying, using the antenna placement information, antennas associated with the second cellular service provider located within the first area;

retrieving information related to the coverage of the identified antennas associated with the second cellular service provider; and displaying, on the map of the first area presented on the first terminal, area coverage indicators corresponding to the identified antennas associated with the second cellular service provider, wherein coverage gaps on the first route can be identified by the user.

2. The method as defined in claim 1, wherein in the coverage indicators are in the form of circles having a first diameter.

3. The method as defined in claim 1, further comprising providing the user with a numerical indication for the area coverage for the first cellular provider and a numerical indication for the area coverage for the second cellular provider.

4. The method as defined in claim 1, wherein the cellular antenna placement information is received from a governmental agency and a non-governmental entity.

5. The method as defined in claim 1, wherein the first terminal is located in a physical store.

6. The method as defined in claim 1, wherein the first terminal is located in one of a home and an office of the user.

7. The method as defined in claim 1, wherein the first route includes at least a tunnel.

8. The method as defined in claim 1, wherein the first route includes at least a train route.

9. The method as defined in claim 1, further comprising offering the user accessories based at least partly on the at least first route.

10. A method of identifying telecommunications infrastructure placement, comprising:

storing cellular antenna placement information for a plurality of cellular antennas associated with a first service provider in a database;

storing cellular antenna placement information for a plurality of cellular antennas associated with a second service provider in the database;

transmitting a request over a network to a first terminal, for a user to identify at least a first location in which the user intends to utilize cellular service;

receiving over the network the user identification of the first location;

transmitting information to the first terminal, including map information for the first location and for related travel routes;

requesting the user to identify at least one of the travel routes on which the user intends to travel;

identifying the cellular coverage for areas along the at least one travel route provided by the first service provider, based at least upon the antenna placement information for the plurality of cellular antennas associated with the first service provider;

transmitting to the first terminal display information indicating the cellular coverage for areas along the at least one travel route provided by the cellular service provider;

identifying the cellular coverage for areas along the at least one travel route provided by the second cellular service provider, based at least upon the antenna placement information for the plurality of cellular antennas associated with the second service provider; and transmitting to the first terminal display information indicating the cellular coverage for areas along the at least one travel route provided by the second service provider.

11. The method as defined in claim 10, wherein the display information, indicating the cellular coverage for the first and second service providers, is used to display on the first terminal discrete indicators of the approximate coverage of individual antennas along the at least one travel route.

12. The method as defined in claim 10, wherein the display information, indicating the cellular coverage for the first service provider, is used to display on the first terminal a plurality of indicators illustrating the approximate coverage of a corresponding plurality of antennas along the at least one travel route.

13. The method as defined in claim 10, wherein the display information, indicating the cellular coverage for the first service provider, is used to display at least a first coverage break along the at least one travel route on the first terminal.

14. The method as defined in claim 10, wherein the first terminal is located in a physical store.

15. The method as defined in claim 10, wherein the first terminal is located in one of a home and an office of the user.

16. The method as defined in claim 10, further comprising transmitting a request, over the network to the first terminal, for the user to identify a second location in which the user intends to utilize cellular service and a travel route connecting the first location and the second location.

17. The method as defined in claim 10, further comprising providing a numerical indication of the first service provider's quality of service.

18. A system for correlating user usage information with a service provider's service coverage, the system comprising:

a database configured to store cellular antenna location information for a plurality of cellular antennas associated with a first service provider, and to store cellular antenna placement information for a plurality of cellular antennas associated with a second service provider;

at least a first instruction stored in memory configured to transmit a request over a network to a first terminal for a user to identify at least a first location in which the user intends to utilize cellular service;

at least a second instruction configured to request the user to identify a travel route at least connecting to the first location on which the user uses cellular service;

at least a third instruction configured to determine the cellular coverage provided by the first service provider for areas along the travel route, based at least upon the antenna location information for the plurality of cellular antennas associated with the first service provider;

at least a fourth instruction configured to provide to the first terminal information indicating the cellular coverage for areas along the travel route provided by the first service provider; and at least a fifth instruction configured to provide to the first terminal information indicating the cellular coverage for areas along the travel route provided by the second service provider.

19. The system as defined in claim 18, further comprising a service plan database configured to store service plan information for a plurality of service providers.

20. The system as defined in claim 18, further comprising a product database configured to store cellular phone product information for a plurality of product providers.

21. The system as defined in claim 18, further comprising a physical store in which the first terminal is located.

22. The system as defined in claim 18, further comprising mapping data used to generate display information for the travel route.

23. The system as defined in claim 18, further comprising a sixth instruction used to access updated service data from a service provider.

* * * * *